United States Patent
Hiraoka et al.

(10) Patent No.: US 9,678,562 B2
(45) Date of Patent: Jun. 13, 2017

(54) INFORMATION PROCESSING APPARATUS, DATA TRANSFER APPARATUS, AND CONTROL METHOD FOR DATA TRANSFER APPARATUS

(71) Applicant: CANON KABUSHIKI KAISHA, Tokyo (JP)

(72) Inventors: Takeshi Hiraoka, Tokyo (JP); Shiori Wakino, Tokyo (JP); Mitsuhiro Inagaki, Yokohama (JP); Koichi Morishita, Komae (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 84 days.

(21) Appl. No.: 14/553,852

(22) Filed: Nov. 25, 2014

(65) Prior Publication Data

US 2015/0160716 A1 Jun. 11, 2015

(30) Foreign Application Priority Data

Dec. 6, 2013 (JP) .................................. 2013-253609
Aug. 6, 2014 (JP) .................................. 2014-160802

(51) Int. Cl.
*G06F 1/32* (2006.01)

(52) U.S. Cl.
CPC ........ *G06F 1/3253* (2013.01); *Y02B 60/1235* (2013.01); *Y02B 60/32* (2013.01)

(58) Field of Classification Search
None
See application file for complete search history.

(56) References Cited

U.S. PATENT DOCUMENTS

| | | | | |
|---|---|---|---|---|
| 6,631,434 B1* | 10/2003 | Johnson | .................. | G06F 13/24 710/260 |
| 6,711,691 B1* | 3/2004 | Howard | .................. | G06F 1/325 713/300 |
| 7,093,152 B2 | 8/2006 | Shikata et al. | | |
| 7,962,678 B2 | 6/2011 | Minami et al. | | |
| 8,140,727 B2 | 3/2012 | Minami et al. | | |
| 8,448,001 B1* | 5/2013 | Zhu | ........................ | G06F 1/3206 713/320 |
| 9,286,257 B2* | 3/2016 | Hofmann | .................. | G06F 1/06 |
| 9,298,210 B2* | 3/2016 | Aoki | .......................... | G06F 1/04 |
| 2003/0135676 A1* | 7/2003 | Jensen | .................. | G06F 1/3215 710/107 |
| 2003/0172310 A1* | 9/2003 | Moyer | .................. | G06F 1/3203 713/300 |

(Continued)

FOREIGN PATENT DOCUMENTS

JP 4733877 B2 7/2011

*Primary Examiner* — Nitin Patel
*Assistant Examiner* — Kevin Stewart
(74) *Attorney, Agent, or Firm* — Fitzpatrick, Cella, Harper & Scinto

(57) ABSTRACT

A bus system comprises a plurality of bus modules each for performing data transfer between a master module and a slave module. A power control module controls transition to a power-saving mode of each bus module based on communication with the plurality of bus modules. The power control module comprises a plurality of control modules corresponding to the plurality of bus modules respectively. Each control module performs communication with the corresponding bus module using power control signals.

50 Claims, 31 Drawing Sheets

(56) References Cited

U.S. PATENT DOCUMENTS

| | | | | |
|---|---|---|---|---|
| 2011/0235459 | A1* | 9/2011 | Ware | G11C 7/04 365/233.11 |
| 2013/0031284 | A1* | 1/2013 | Yun | G06F 1/3237 710/105 |
| 2013/0054855 | A1* | 2/2013 | Yamashita | G06F 1/3253 710/110 |
| 2013/0117593 | A1* | 5/2013 | Nooney | G06F 1/3237 713/322 |
| 2013/0254467 | A1* | 9/2013 | Parizi | G06F 12/0246 711/103 |
| 2014/0327833 | A1* | 11/2014 | Kabuto | G06F 1/266 348/730 |

* cited by examiner

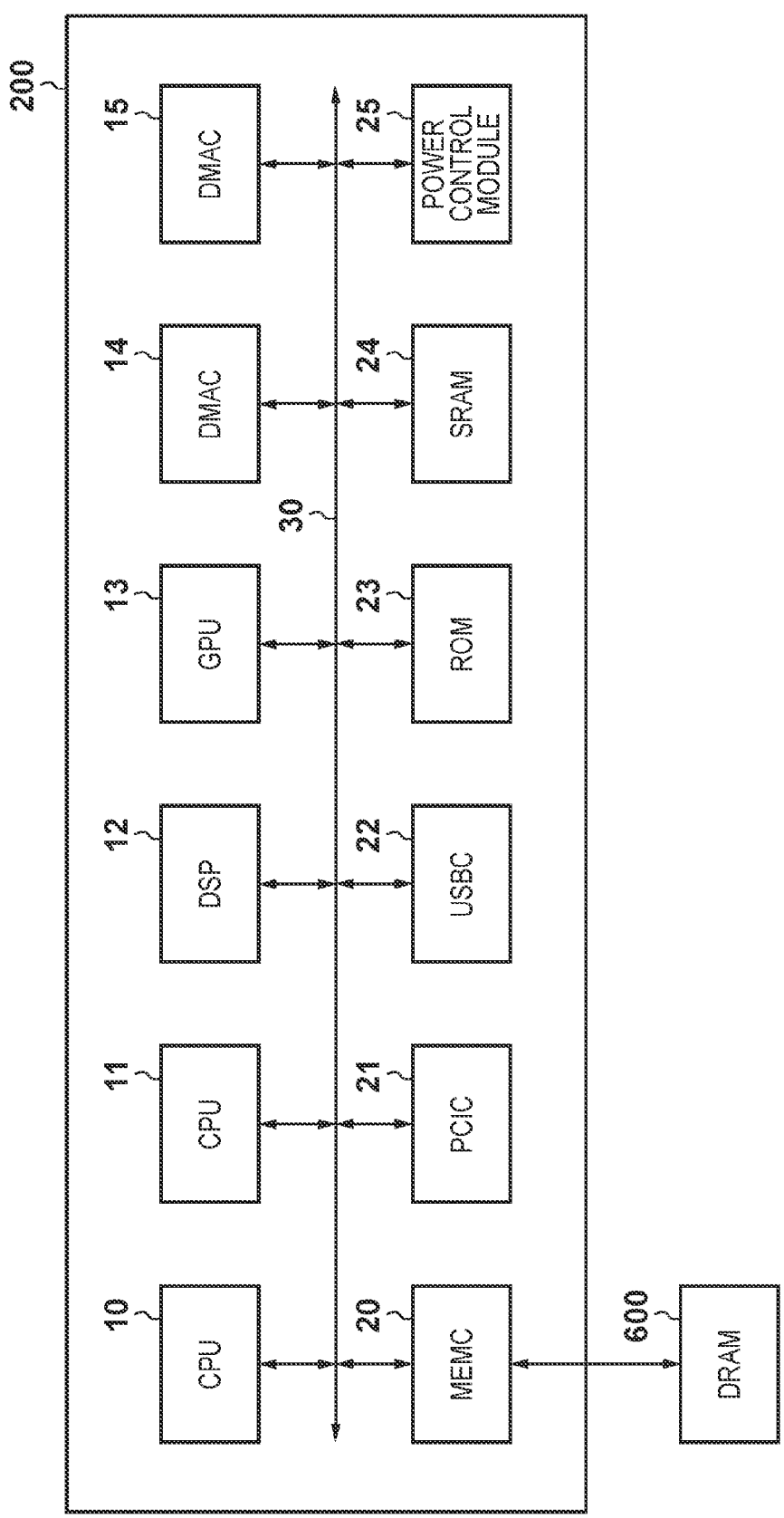

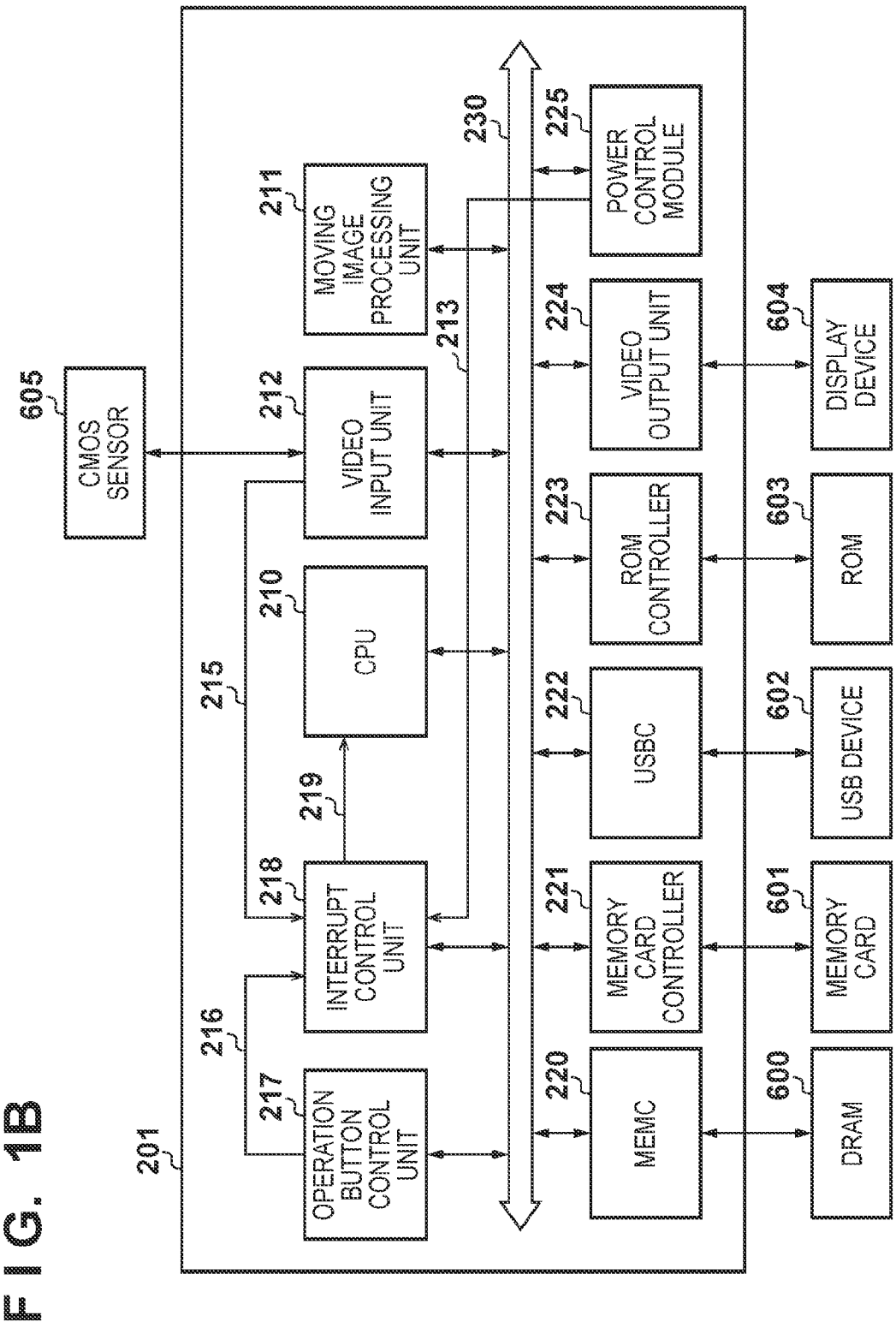

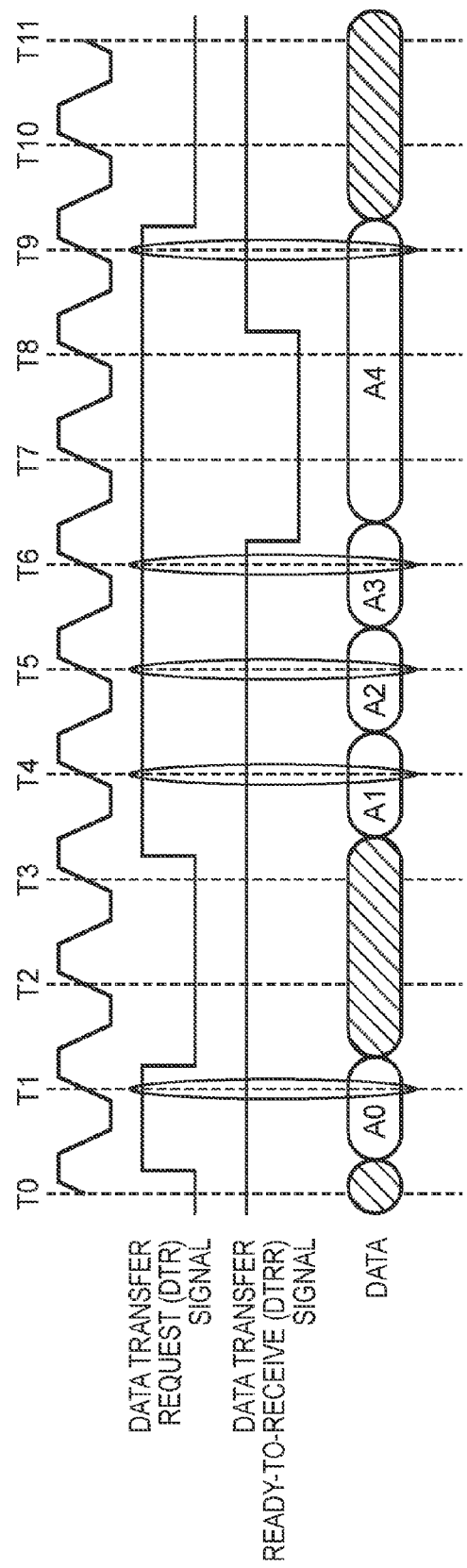

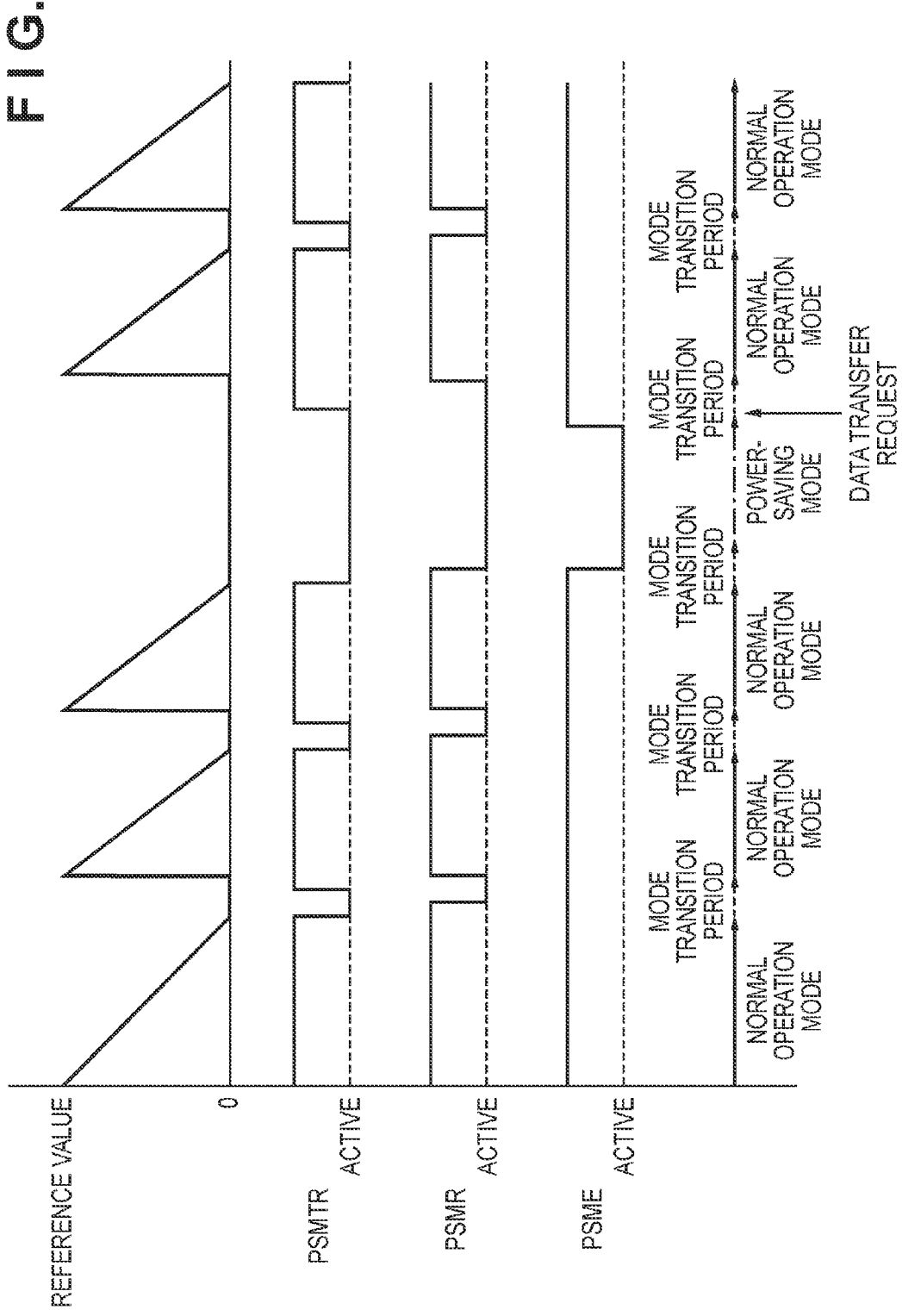

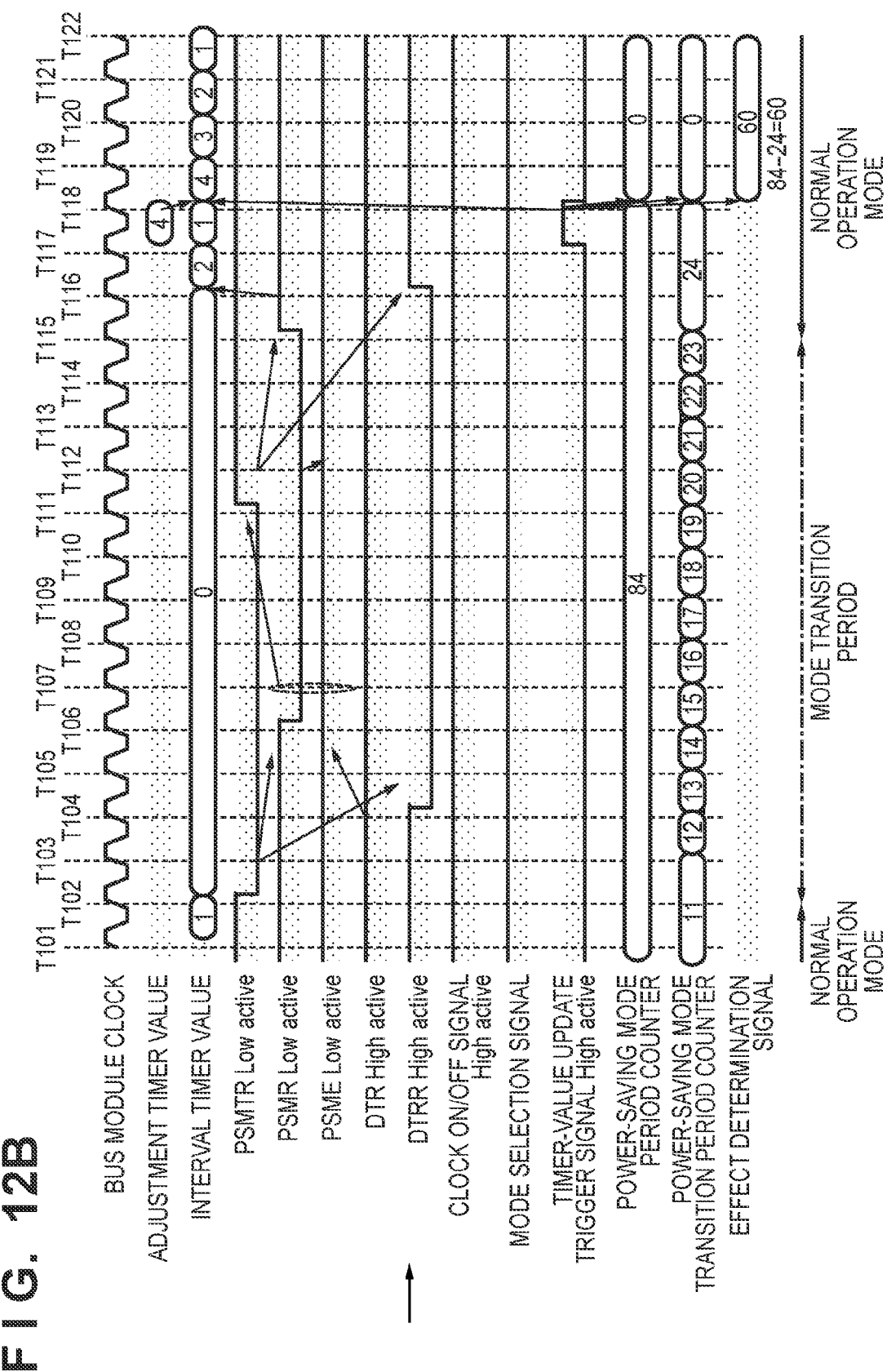

F I G. 15A

| FRAME NUMBER | 1 | 2 | 3 | 4 | 5 | 6 | 7 | 8 | 9 | 10 |
|---|---|---|---|---|---|---|---|---|---|---|
| ADJUSTMENT TIMER VALUE | 50 | 60 | 70 | 80 | 90 | 100 | 110 | 120 | 130 | 140 |
| POWER-SAVING MODE PERIOD COUNTER VALUE | 925 | 925 | 925 | 925 | 925 | 900 | 850 | 810 | 700 | 500 |
| POWER-SAVING MODE TRANSITION PERIOD COUNTER VALUE | 865 | 805 | 745 | 575 | 435 | 300 | 280 | 260 | 200 | 195 |
| EFFECT DETERMINATION SIGNAL VALUE | 60 | 120 | 180 | 350 | 490 | 600 | 570 | 550 | 500 | 305 |

F I G. 15B

| DEVICE STATE | OPTIMUM-VALUE DECISION METHOD | SETTING BEFORE PRODUCT SHIPMENT | | | TIMER-VALUE ADJUSTMENT RESULT BEFORE PRODUCT SHIPMENT | TIMER-VALUE ADJUSTMENT PARAMETER AFTER SHIPMENT | | |
|---|---|---|---|---|---|---|---|---|
| | | TIMER-VALUE ADJUSTMENT PARAMETER | | | | | | |
| | | START TIMER VALUE | STEP VALUE | TIMER UPDATE COUNT | OPTIMUM TIMER VALUE | START TIMER VALUE | STEP VALUE | TIMER UPDATE COUNT |
| DEVICE INITIALIZATION | TYP_1 | 1 | 1 | 500 | 20 | – | – | – |
| OPERATION STANDBY | TYP_1 | 1 | 1 | 1000 | 10 | – | – | – |
| LCD OFF | TYP_1 | 1 | 1 | 1000 | 3 | – | – | – |
| MOVING IMAGE SHOOTING | | | | | | | | |
| FHD | TYP_2 | 1 | 1 | 1000 | – | 200 | 20 | 10 |
| HD | TYP_2 | 1 | 1 | 1000 | – | 150 | 15 | 10 |
| SD | TYP_2 | 1 | 1 | 1000 | – | 50 | 10 | 10 |
| STILL IMAGE SHOOTING | | | | | | | | |
| L DISABLE OF CONTINUOUS SHOOTING | TYP_1 | 1 | 1 | 100 | 110 | – | – | – |
| ENABLE OF CONTINUOUS SHOOTING | TYP_2 | 1 | 1 | 100 | – | 90 | 15 | 10 |
| M DISABLE OF CONTINUOUS SHOOTING | TYP_1 | 1 | 1 | 100 | 100 | – | – | – |
| ENABLE OF CONTINUOUS SHOOTING | TYP_2 | 1 | 1 | 100 | – | 50 | 10 | 10 |
| S DISABLE OF CONTINUOUS SHOOTING | TYP_1 | 1 | 1 | 100 | 40 | – | – | – |
| ENABLE OF CONTINUOUS SHOOTING | TYP_2 | 1 | 1 | 100 | – | 30 | 6 | 10 |
| MOVING IMAGE PLAYBACK | | | | | | | | |
| FHD | TYP_2 | 1 | 1 | 100 | – | 100 | 10 | 10 |
| HD | TYP_2 | 1 | 1 | 100 | – | 75 | 8 | 10 |
| SD | TYP_2 | 1 | 1 | 100 | – | 50 | 5 | 10 |
| STILL IMAGE PLAYBACK | | | | | | | | |
| L | TYP_1 | 1 | 1 | 100 | 200 | – | – | – |
| M | TYP_1 | 1 | 1 | 100 | 120 | – | – | – |
| S | TYP_1 | 1 | 1 | 100 | 90 | – | – | – |

F I G. 18A

| DEVICE STATE | | OPTIMUM-VALUE DECISION METHOD | BEFORE PRODUCT SHIPMENT | | AFTER PRODUCT SHIPMENT | |
|---|---|---|---|---|---|---|
| | | | MODE SELECTION SIGNAL | TIMER-VALUE UPDATE TRIGGER SIGNAL | MODE SELECTION SIGNAL | TIMER-VALUE UPDATE TRIGGER SIGNAL |
| DEVICE INITIALIZATION | | TYP_1 | ACTIVATED UPON POWER-ON, DEACTIVATED WHEN PREDETERMINED TRIGGER IS INPUT | PERIODIC TRIGGER (0.1ms) | | |
| OPERATION STANDBY | | TYP_1 | ACTIVATED UPON TRANSITION, DEACTIVATED WHEN PREDETERMINED TRIGGER IS INPUT | PERIODIC TRIGGER (1ms) | | |
| LCD OFF | | TYP_1 | ACTIVATED UPON TRANSITION, DEACTIVATED WHEN PREDETERMINED TRIGGER IS INPUT | PERIODIC TRIGGER (1ms) | | |
| MOVING IMAGE SHOOTING | FHD | TYP_2 | ACTIVATED UPON START OF MOVING IMAGE SHOOTING, DEACTIVATED UPON END OF 1,000 FRAMES | VSYNC | | |
| | HD | TYP_2 | | | | |
| | SD | TYP_2 | | | ACTIVATED UPON START OF MOVING IMAGE SHOOTING, DEACTIVATED UPON END OF 10 FRAMES | VSYNC |

FIG. 18B

| STILL IMAGE SHOOTING | | | | | |
|---|---|---|---|---|---|
| L | DISABLE OF CONTINUOUS SHOOTING | TYP_1 | ACTIVATED UPON TURNING ON STILL IMAGE SHOOTING BUTTON, DEACTIVATED UPON END OF SHOOTING OF 1,000 IMAGES | TURNING ON STILL IMAGE SHOOTING BUTTON | |
| | ENABLE OF CONTINUOUS SHOOTING | TYP_2 | ACTIVATED UPON TURNING ON STILL IMAGE SHOOTING BUTTON FOR FIRST IMAGE AT TIME OF CONTINUOUS SHOOTING, DEACTIVATED UPON END OF SHOOTING OF 1,000 IMAGES | TURNING ON STILL IMAGE SHOOTING BUTTON | ACTIVATED UPON TURNING ON STILL IMAGE SHOOTING BUTTON FOR FIRST IMAGE AT TIME OF CONTINUOUS SHOOTING, DEACTIVATED UPON END OF SHOOTING OF FIVE IMAGES | TURNING ON STILL IMAGE SHOOTING BUTTON |
| M | DISABLE OF CONTINUOUS SHOOTING | TYP_1 | ACTIVATED UPON TURNING ON STILL IMAGE SHOOTING BUTTON, DEACTIVATED UPON END OF SHOOTING OF 1,000 IMAGES | TURNING ON STILL IMAGE SHOOTING BUTTON | |
| | ENABLE OF CONTINUOUS SHOOTING | TYP_2 | ACTIVATED UPON TURNING ON STILL IMAGE SHOOTING BUTTON FOR FIRST IMAGE AT TIME OF CONTINUOUS SHOOTING, DEACTIVATED UPON END OF SHOOTING OF 1,000 IMAGES | TURNING ON STILL IMAGE SHOOTING BUTTON | ACTIVATED UPON TURNING ON STILL IMAGE SHOOTING BUTTON FOR FIRST IMAGE AT TIME OF CONTINUOUS SHOOTING, DEACTIVATED UPON END OF SHOOTING OF FIVE IMAGES | TURNING ON STILL IMAGE SHOOTING BUTTON |
| S | DISABLE OF CONTINUOUS SHOOTING | TYP_1 | ACTIVATED UPON TURNING ON STILL IMAGE SHOOTING BUTTON, DEACTIVATED UPON END OF SHOOTING OF 1,000 IMAGES | TURNING ON STILL IMAGE SHOOTING BUTTON | |
| | ENABLE OF CONTINUOUS SHOOTING | TYP_2 | ACTIVATED UPON TURNING ON STILL IMAGE SHOOTING BUTTON FOR FIRST IMAGE AT TIME OF CONTINUOUS SHOOTING, DEACTIVATED UPON END OF SHOOTING OF 1,000 IMAGES | TURNING ON STILL IMAGE SHOOTING BUTTON | ACTIVATED UPON TURNING ON STILL IMAGE SHOOTING BUTTON FOR FIRST IMAGE AT TIME OF CONTINUOUS SHOOTING, DEACTIVATED UPON END OF SHOOTING OF FIVE IMAGES | TURNING ON STILL IMAGE SHOOTING BUTTON |

F I G. 18C

| MOVING IMAGE PLAYBACK | | | | |
|---|---|---|---|---|
| FHD | TYP 2 | ACTIVATED UPON START OF PLAYBACK OF MOVING IMAGE, DEACTIVATED UPON END OF SHOOTING OF 1,000 IMAGES | ACTIVATED UPON START OF PLAYBACK OF MOVING IMAGE, DEACTIVATED UPON END OF 10 FRAMES | VSYNC |
| HD | TYP 2 | | | |
| SD | TYP 2 | | | |
| STILL IMAGE PLAYBACK | | | | |
| L | TYP 1 | ACTIVATED UPON TURNING ON STILL IMAGE PLAYBACK BUTTON, DEACTIVATED UPON END OF SHOOTING OF 1,000 IMAGES | VSYNC | TURNING ON STILL IMAGE PLAYBACK BUTTON |
| M | TYP 1 | | | |
| S | TYP 1 | | | |

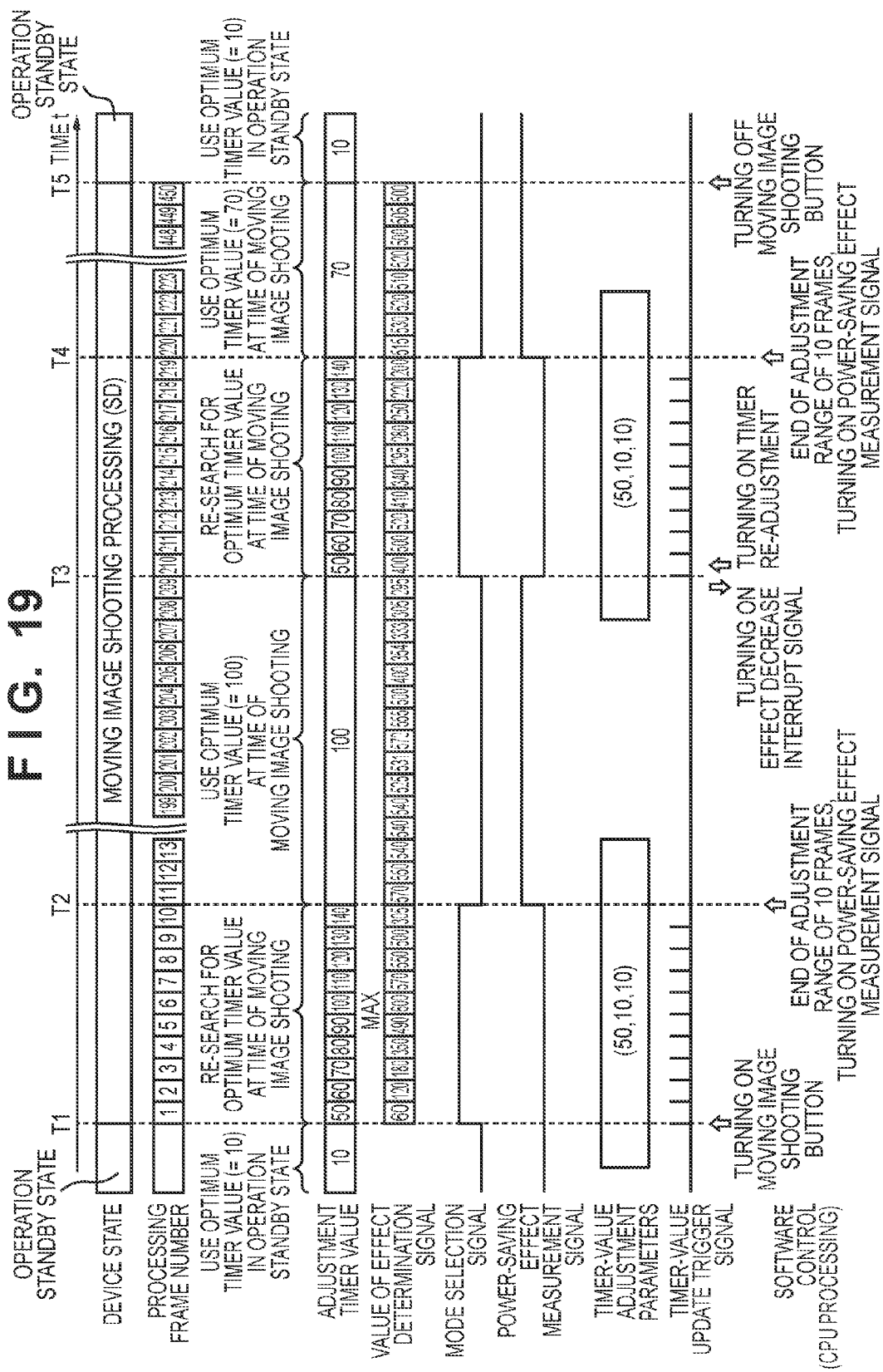

INFORMATION PROCESSING APPARATUS, DATA TRANSFER APPARATUS, AND CONTROL METHOD FOR DATA TRANSFER APPARATUS

BACKGROUND OF THE INVENTION

Field of the Invention

The present invention relates to an information processing apparatus, a data transfer apparatus, and a control method for the data transfer apparatus and, more particularly, to power saving of the data transfer apparatus in the information processing apparatus.

Description of the Related Art

As the degree of integration of a semiconductor integration circuit increases and the processing capability improves, the power consumption increases, thereby requiring measures to reduce the power consumption.

Recent semiconductor integration circuits include a master module for generating a data transfer request, a slave module for responding to a data transfer request, and a bus system for undertaking data transfer. The master module includes a central processing unit (CPU) and a dynamic memory access controller (DMAC). The slave module includes a memory controller and a static random access memory (SRAM) module. The bus system is also called an interconnect, fabric, or on-chip network. In the master module, the power is saved by a technique called dynamic voltage and frequency scaling (DVFS) for dynamically controlling the power supply voltage and frequency, or a technique for interrupting the power supply and clock.

On the other hand, the bus system to which various master modules and slave modules are connected is often in a state in which power and a clock are always supplied in preparation for data transfer from each master module, thus it is difficult to further reduce the power consumption. When the clock frequency is switched or the power supply and clock are on/off-controlled to reduce the power consumption, transfer data may be lost or the system may freeze unless data transfer on the bus system is completed according to a specific procedure. Methods of avoiding loss of transfer data and freezing are roughly classified into a method using a software procedure and a method using a hardware mechanism.

In general, a method using a software procedure controls the power supply and clock of the bus system after confirming that no data transfer request is issued for all the master modules connected to the bus system. Also, there is proposed a method using a bus arbiter as a method using a hardware mechanism (for example, Japanese Patent No. 4733877 (literature 1)).

In recent large-scale semiconductor integration circuits, the number of master modules exceeds 100, and many master modules are driven by an external interrupt or event. In the method using a software procedure, therefore, it is difficult to ensure that all the master modules issue no data transfer requests.

Furthermore, when the power supply and clock of the bus system are controlled by the CPU, program data is speculatively loaded by a cache module and instruction fetch of the CPU, thus a special procedure is required to ensure that no data transfer is performed on the bus system. Consequently, even if it is possible to control the power supply and clock of the bus system to save the power, its opportunity is particularly limited.

In the method using the hardware mechanism described in literature 1, when currently executed processing ends, the arbiter for arbitrating a bus use right in response to assertion of a clock control request signal asserts a clock control confirmation signal by stopping assignment of the bus use right. In recent years, however, a bus system using a peer-to-peer data transfer interface is the mainstream, and an arbiter exists in the bus system. The method using the arbiter cannot interrupt the power supply of the bus system itself.

SUMMARY OF THE INVENTION

In one aspect, an information processing apparatus comprising: a data transfer unit comprising a plurality of bus modules, wherein each bus module is configured to perform data transfer between a plurality of master modules and at least one slave module; and a power control unit configured to control transition to a power-saving mode of each bus module based on communication with each of the plurality of bus modules, wherein the power control unit is configured to comprise a plurality of control units corresponding to the plurality of bus modules respectively, and each control unit is configured to perform communication with the corresponding bus module using power control signals.

In other aspect, a data transfer apparatus comprising a plurality of bus modules configured to perform data transfer between a master module and a slave module by a handshake using a data transfer request signal and a data transfer ready-to-receive signal, wherein each bus module comprises: a control unit configured to, in a case where a request signal to request transition to a power-saving mode is received, change a state of the data transfer ready-to-receive signal to transit to a transfer data non-reception state, and determine whether or not there is data transfer in progress; a detection unit configured to detect a state of the data transfer request signal received by the bus module; and an output unit configured to output an enable signal indicating enable/disable of transition to the power-saving mode based on a result of the determination and a result of the detection.

In other aspect, a control method of a data transfer apparatus comprising a plurality of bus modules, each of which is configured to perform data transfer between a plurality of master modules and at least one slave module, and a power control unit, the method comprising steps of: performing communication between the power control unit and each of the plurality of bus module; and controlling, based on the communication, transition to a power-saving mode of each bus module by the control unit, wherein the power control unit is configured to comprise a plurality of control units corresponding to the plurality of bus modules respectively, and each control unit is configured to perform communication with the corresponding bus module using power control signals.

According to these aspects, it is possible to save the power of a data transfer apparatus without requiring special processing for avoiding loss of transfer data and freezing of the system.

Further features of the present invention will become apparent from the following description of exemplary embodiments with reference to the attached drawings.

BRIEF DESCRIPTION OF THE DRAWINGS

FIGS. 1A and 1B are block diagrams each showing the arrangement of an information processing apparatus.

FIG. 3 is a timing chart for explaining data transfer.

FIG. 9 is a view for explaining the relationship between power control signals and the count value of an interval timer.

FIGS. 12A and 12B are timing charts for explaining a power-saving effect measurement method.

FIG. 15A is a table showing an example of the power-saving effect measured for a timer value.

FIG. 15B is a table for explaining an optimum timer-value decision method in each of divided device states.

FIGS. 18A to 18C are a table showing an example of the relationship between a device state and a timer-value adjustment mode selection signal and an example of the relationship between the device state and a timer-value update trigger signal in a digital camera product.

FIG. 19 is a timing chart for explaining an operation of re-searching for an optimum timer value.

DESCRIPTION OF THE EMBODIMENTS

Figure 2A:
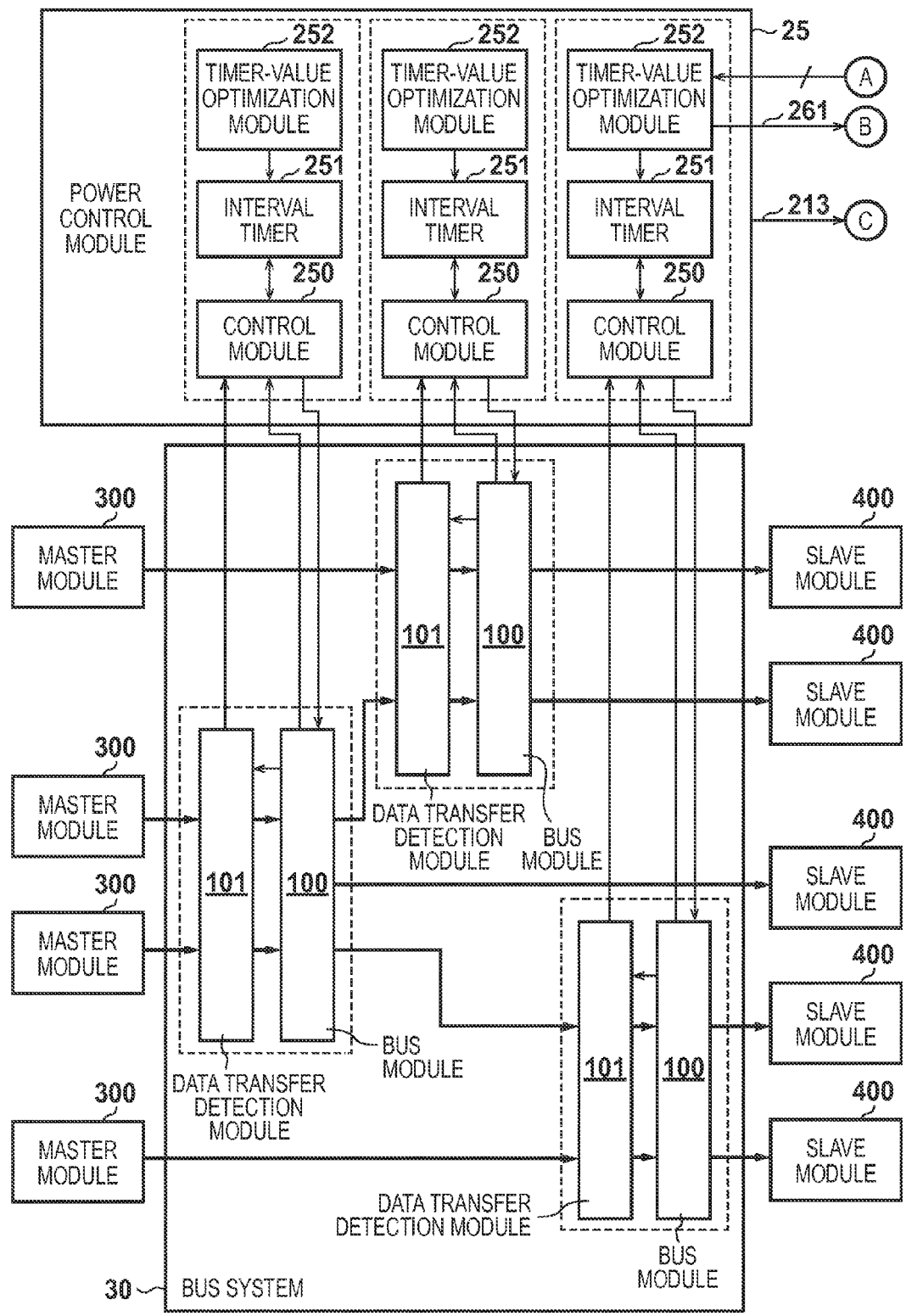
FIGS. 2A and 2B are block diagrams showing the arrangement of a bus system and power control module.

An information processing apparatus, a data transfer apparatus, and a control method for the data transfer apparatus according to an embodiment of the present invention will be described in detail below with reference to the accompanying drawings. Note that the embodiment is not intended to limit the present invention to the scope of the appended claims, and not all combinations of arrangements described in the embodiment are indispensable for the means to solve the problems according to the present invention.

[Arrangement of Apparatus]

FIG. 1A is a block diagram showing the arrangement of an information processing apparatus 200. The information processing apparatus 200 is a computer apparatus, and includes a bus system 30 for undertaking data transfer. A plurality of CPUs 10 and 11 as processors, a digital signal processor (DSP) 12, a graphical processing unit (GPU) 13, and the like are connected to the bus system 30.

Furthermore, a plurality of DMACs 14 and 15 as data transfer controllers, a memory controller (MEMC) 20, and the like are connected to the bus system 30. For example, a PCI Express® controller (PCIC) 21, a USB (Universal Serial Bus) controller (USBC) 22, and the like for connecting peripheral devices (not shown) are connected to the bus system 30. A read only memory (ROM) 23, a static random access memory (SRAM) 24, and the like are connected as memories to the bus system 30. A power control module 25 is connected to the bus system 30.

The MEMC 20 is connected to a dynamic random access memory (DRAM) 600 outside the information processing apparatus 200. The CPUs 10 and 11 use the DRAM 600 as a work memory to execute a program stored in the ROM 23. The arrangement of the information processing apparatus 200 shown in FIG. 1A is the representative arrangement of a semiconductor apparatus called a system-on-chip. The bus system 30 for controlling data transfer is called an interconnect, fabric, on-chip network, or network-on-chip.

Note that the CPUs 10 and 11, DSP 12, GPU 13, and DMACs 14 and 15 are a group of modules each for issuing a data transfer request, and will be collectively referred to as "master modules" 300 hereinafter. On the other hand, the MEMC 20, PCIC 21, USBC 22, ROM 23, SRAM 24, and power control module 25 are a group of modules each for responding after receiving a data transfer request, and will be collectively referred to as "slave modules" 400 hereinafter. Note that although not shown in FIG. 1A, there also exists a module having both a function of issuing a data transfer request and a function of responding.

FIG. 1B is a block diagram showing the arrangement of an information processing apparatus 201. The information processing apparatus 201 has an arrangement represented by a semiconductor apparatus called a System-on-Chip (SoC) for a digital camera system, which is centered on a bus system 230 and an interrupt control unit 218. Note that although not shown in FIG. 1B, the SoC includes a clock generator for generating a clock signal to be supplied to each module, and a reset generator for generating a reset signal.

The information processing apparatus 201 includes the bus system 230 for undertaking data transfer. The bus system 230 is called an interconnect, fabric, on-chip network, or network-on-chip. In the bus system 230, a CPU 210 for performing processing of the overall information processing apparatus 201 exists as the master module 300 for issuing a data transfer request.

In the bus system 230, a moving image processing unit 211, a video input unit 212, a video output unit 224, a memory card controller 221, and a USBC 222 also exist as the master modules 300. The moving image processing unit 211 performs various kinds of image processing for data of a captured still image or moving image, and compresses the data having undergone the image processing. The video input unit 212 receives video data converted into digital data from an external CMOS sensor 605, and transfers the video data to the external DRAM 600 through an MEMC 220.

The video output unit 224 transfers the video data stored in the DRAM 600 to an external display device 604 through the MEMC 220. The memory card controller 221 is a module for transferring data of a captured still image or moving image to an external memory card 601. The USBC 222 is a module for transferring data of a captured still image or moving image to an external USB device 602 through a serial bus such as USB.

In the bus system 230, an operation button control unit 217, the interrupt control unit 218, the MEMC 220, a ROM controller 223, and a power control module 225 exist as the slave modules 400 each for responding after receiving a data transfer request. The operation button control unit 217 detects an operation of a button on the digital camera body, and outputs an interrupt signal 216 indicating the detection of the button operation. The power control module 225 serves to control power saving of the bus system 230, and outputs an effect decrease interrupt signal 213 indicating a decrease in power-saving effect.

The interrupt control unit 218 receives the interrupt signal 216 of the operation button control unit 217, an interrupt signal 215 for video vertical synchronization of the video input unit 212, or the effect decrease interrupt signal 213 of the power control module 225, and outputs an interrupt signal 219 to the CPU 210. The MEMC 220 transfers data to the external DRAM 600. The ROM controller 223 reads out data from an external ROM 603 storing program codes. Note that the ROM 603 is a recording medium such as an electrically erasable and programmable ROM (EEPROM).

As in FIG. 1A, although not shown in FIG. 1B, there also exists a module having both a function of issuing a data transfer request and a function of responding. In FIGS. 1A and 1B, the components having the same name have the same function. For example, in FIGS. 1A and 1B, the CPUs 10 and 210, the bus systems 30 and 230, or the power control modules 25 and 225 have the same function. The components having the same function will be described below using only one of reference numerals.

[Bus System and Power Control Module]

Figure 2B:
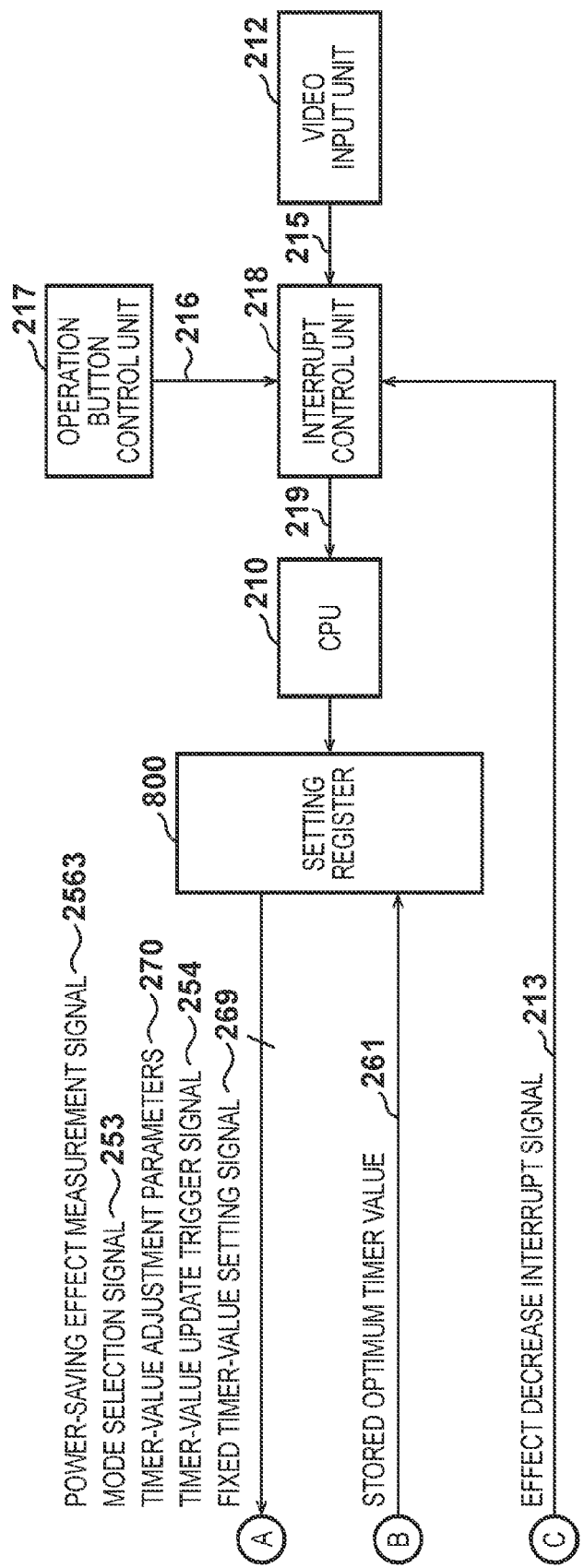

FIGS. 2A and 2B are block diagrams showing the arrangement of the bus system 30 and power control module 25. As the numbers of master modules 300 and slave modules 400, which are connected to the bus system 30, increase, the bus system 30 is recently constituted by a plurality of data transfer apparatuses (to be referred to as "bus modules" hereinafter) 100 for controlling data transfer. This arrangement is adopted in terms of physical timing convergence. Each bus module 100 includes a data transfer detection module 101.

Data transfer will be explained with reference to FIG. 3. Data is transferred by a two-line handshake protocol of a data transfer request signal (to be referred to as a "DTR signal" hereinafter) and a data transfer ready-to-receive signal (to be referred to as a "DTRR signal" hereinafter). A module (to be referred to as a "transmission module" hereinafter) for transmitting data drives the DTR signal and a transfer data signal line. A module (to be referred to as a "reception module" hereinafter) for receiving data drives the DTRR signal. When both the DTR signal and the DTRR signal are active, data transfer is implemented. Note that when the DTR signal and DTRR signal are at high level, they are active (high active).

Each bus module 100 (to be described in detail later) includes one power control interface (to be referred to as a "power control I/F" hereinafter) and a plurality of data transfer interfaces (to be referred to as "data transfer I/Fs" hereinafter). The bus module 100 is connected to the master modules 300, slave modules 400, and another bus module 100 through the data transfer I/Fs, and connected to the power control module 25 through the power control I/F. As shown in FIG. 2B, there exists a setting register 800 which notifies the power control module 25 of information about setting values upon receiving an instruction from the CPU 210. The information provided to the power control module 25 and the internal arrangement of the power control module 25 will be described in detail later.

Although described in detail later, three power control signals, that is, a power-saving mode transition request signal (to be referred to as a "PSMTR signal" hereinafter), a power-saving mode response signal (to be referred to as a "PSMR signal" hereinafter), and a power-saving mode enable signal (to be referred to as a "PSME signal" hereinafter) are communicated between each bus module 100 and the power control module 25 through the power control I/F. Note that each bus module 100 transmits the PSME signal to the power control module 25 through the data transfer detection module 101.

The power control module 25 outputs the PSMTR signal for requesting to transit to the power-saving mode, and the bus module 100 outputs the PSMR signal. The PSME signal indicating enable/disable of transition to the power-saving mode is an OR signal of the output signal of the bus module 100 and the detection result of the data transfer detection module 101. Note that when the power control signal is at low level, it is active (low active).

In the power-saving mode, the clock and/or power supply of the bus module 100 are stopped or changed. On the other hand, although the data transfer detection module 101 functions as part of the bus module 100, the power supply of the data transfer detection module 101 is independent of the bus module 100, and it is thus possible to set the state of the PSME signal regardless of whether the bus module 100 is in the power-saving mode.

Figure 4:
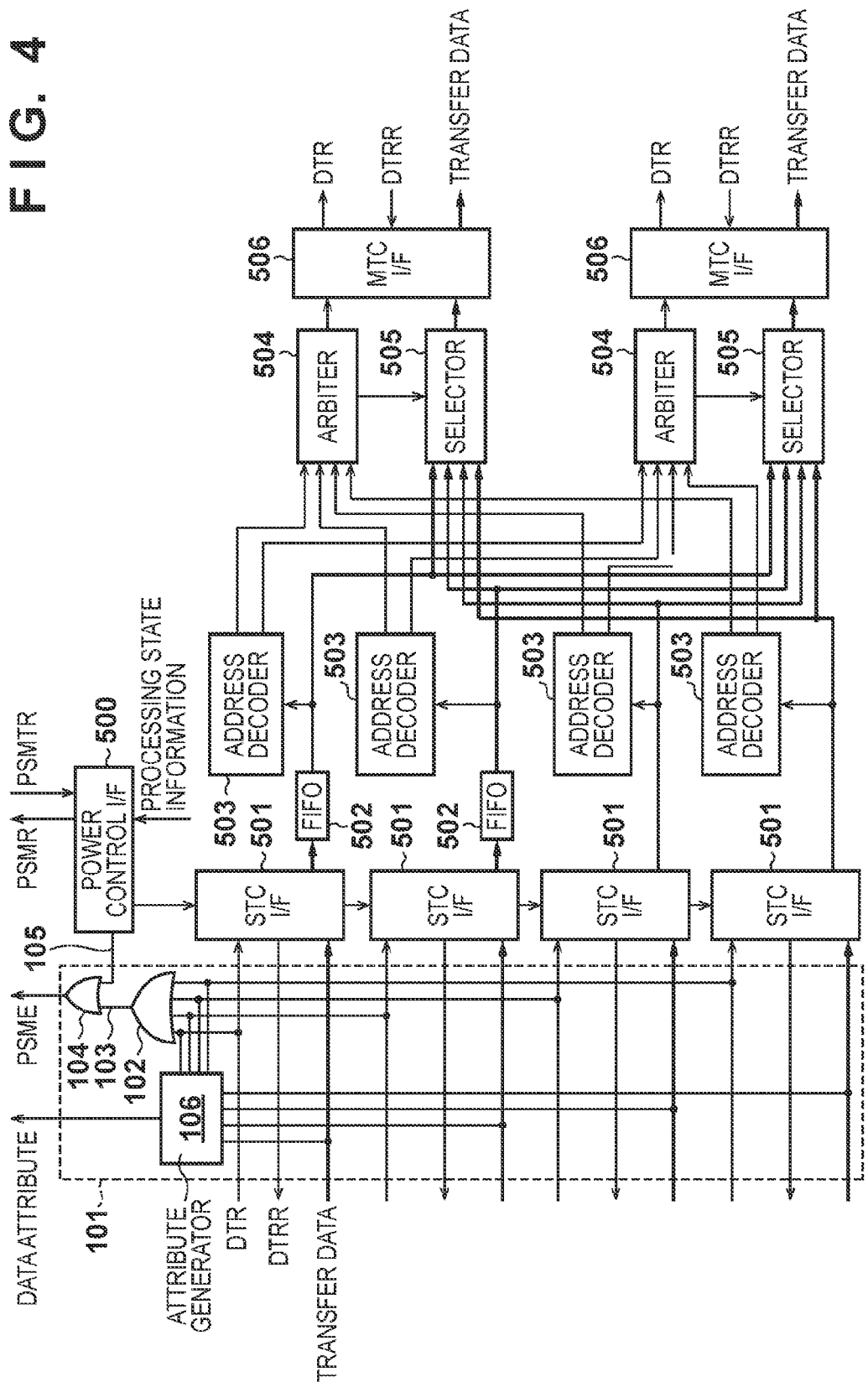
FIG. 4 is a block diagram showing the arrangement of a bus module and data transfer detection module.

FIG. 4 is a block diagram showing the arrangement of the bus module 100 and data transfer detection module 101. The bus module 100 includes a plurality of slave data transfer control I/Fs (to be referred to as "STC I/Fs" hereinafter) 501 each for receiving transfer data, a plurality of master data transfer control I/Fs (to be referred to as "MTC I/Fs" hereinafter) 506 each for transmitting the transfer data to the succeeding stage, and a power control I/F 500. Note that data received by each STC I/F 501 may be stored in a corresponding first-in first-out memory (FIFO) 502.

Each address decoder 503 analyzes the transfer destination of the data output from the STC I/F 501 or FIFO 502, and transmits a data transfer request to an arbiter 504 corresponding to the transfer destination. The arbiter 504 arbitrates to select one of the data transfer requests, and outputs an arbitration result to a selector 505 and the MTC I/F 506.

The selector 505 selects transfer data based on the arbitration result, and outputs the selected transfer data to the MTC I/F 506. The MTC I/F 506 receives the arbitration result and the selected transfer data, and transmits/receives data to/from the bus module 100 or slave module 400 of the succeeding stage.

On the other hand, upon receiving the PSMTR signal from the power control module 25, the power control I/F 500 outputs the inactive DTRR signal to each STC I/F 501 to indicate transition to the power-saving mode. Each STC I/F 501 outputs the DTRR signal to the transmission module (master module 300 or bus module 100) of the preceding stage, and transits to a state (to be referred to as a "non-reception state" hereinafter) in which no transfer data is newly received.

Upon detecting the processing state of the bus module 100 and detecting a processing progress state, the power control I/F 500 maintains the PSMR signal at high level (inactive). The power control I/F 500 determines the processing state of the bus module 100 using information about the availability of each FIFO 502, information about the number of outstanding transfer data (response status management of the slave module 400), and the like.

Although only some transfer data are shown in FIG. 4, actual transfer data include address data, write data, read data, and response data, which are transferred through different circuits. For the address data and write data, the master module 300 or bus module 100 is a module for driving the DTR signal. On the other hand, for the read data and response data, the slave module 400 or bus module 100 is a module for driving the DTR signal.

An OR gate 102 of the data transfer detection module 101 outputs an OR signal 103 obtained by ORing the DTR signals received by the respective STC I/Fs 501. An OR gate 104 receives the OR signal 103 and a signal 105 which is set at low level when the power supply of the bus module 100 is interrupted, and outputs the OR of the OR signal 103 and the signal 105 as the PSME signal.

An attribute generator 106 receives the DTR signals received by all the STC I/Fs 501, and master IDs indicating modules for driving the DTR signals, and outputs the attribute signal (to be referred to as a "data attribute signal" hereinafter) of the data which is requested to be transferred.

When Transition to Power-Saving Mode is Enabled

The operation of the power control module 25 and bus module 100 when transition to the power-saving mode is enabled will be described with reference to FIG. 5. Upon receiving a power-saving mode transition trigger, the power control module 25 activates the PSMTR signal (time T2).

When the bus module 100 detects that the PSMTR signal is active (T3), it deactivates the DTRR signal (T4), and transits to the non-reception state to detect the processing state. When the bus module 100 detects a non-processing state (the absence of transfer data) (T5), it sets the signal 105 at low level to activate the PSMR signal (T5), thereby activating the PSMR signal (T6).

Figure 5:
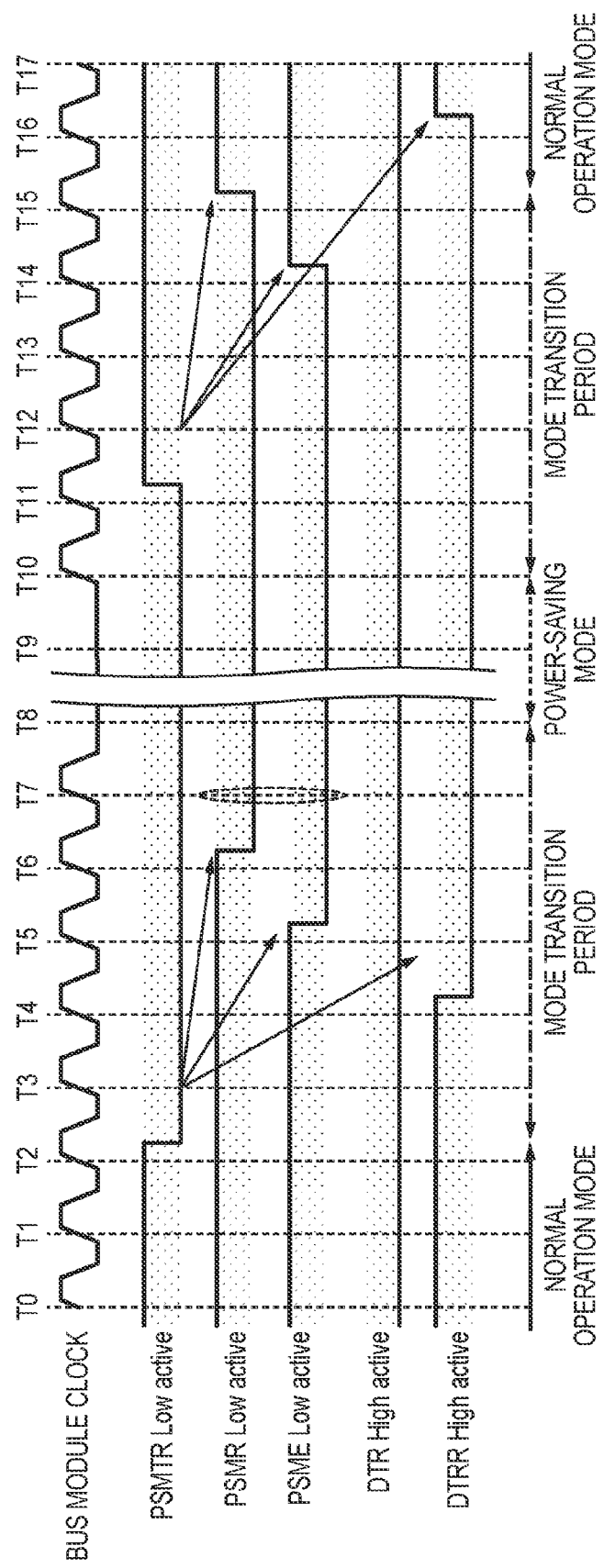
FIG. 5 is a timing chart for explaining the operation of the power control module and bus module when transition to a power-saving mode is enabled.

In the example shown in FIG. 5, since the DTR signal is inactive, the OR signal 103 is set at low level, thereby indicating the absence of new transfer data. As a result, both the OR signal 103 and the signal 105 are at low level, and the PSME signal output from the OR gate 104 is set at low level (activated) at time T5.

When the power control module 25 detects that the PSMR signal is active (T7), it determines the PSME signal. When the power control module 25 detects that the PSME signal is active (T7), it determines that the bus module 100 has enabled transition to the power-saving mode, and changes or interrupts the power supply and/or clock of the bus module 100 (T8 to T10).

Upon receiving a normal operation mode transition trigger, the power control module 25 supplies the clock and/or power of the bus module 100, and then deactivates the PSMTR signal (T11).

If the bus module 100 detects that the PSMTR signal is inactive (T12), it sets the signal 105 at high level to deactivate the PSME signal (T14). The bus module 100 then deactivates the PSMR signal (T15), and activates the DTRR signal (T16), thereby canceling the non-reception state to enter a state in which new transfer data is received.

When Transition to Power-Saving Mode is Disabled

The operation of the power control module 25 and bus module 100 when transition to the power-saving mode is disabled will be described with reference to FIG. 6. Upon receiving a power-saving mode transition trigger, the power control module 25 activates the PSMTR signal (time T2).

If the bus module 100 detects that the PSMTR signal is active (T3), it deactivates the DTRR signal (T4), and transits to the non-reception state to detect the processing state. If the bus module 100 detects a processing progress state (the presence of transfer data) (T5), it maintains the signal 105 at high level to maintain the PSMR signal in the active state (T5), and activates the PSMR signal (T6).

Figure 6:
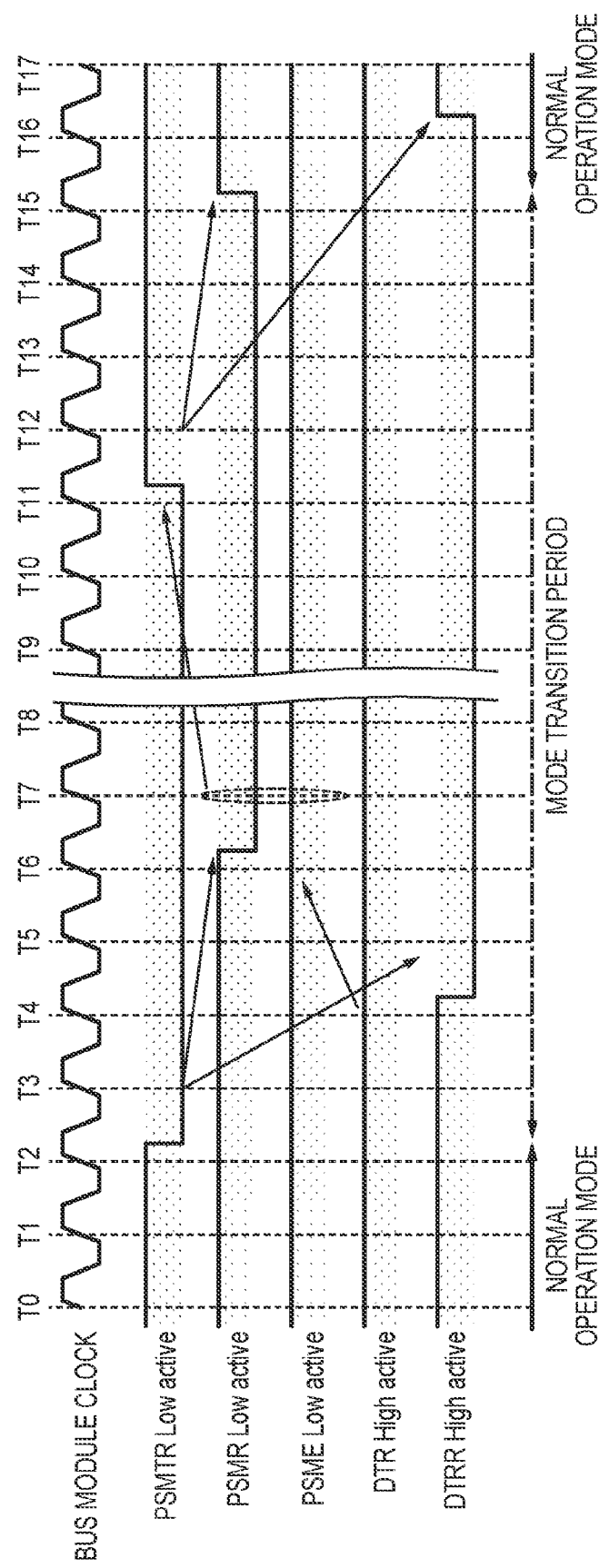
FIG. 6 is a timing chart for explaining the operation of the power control module and bus module when transition to the power-saving mode is disabled.

In the example shown in FIG. 6, the DTR signal is active, the OR signal 103 is at high level, and new transfer data exists. In this example, both the OR signal 103 and the signal 105 are at high level, and the PSME signal output from the OR gate 104 is set at high level (deactivated) at time T5. After that, even if processing of the transfer data by the bus module 100 is completed (non-processing state) to set the signal 105 at low level, the PSME signal is inactive as long as the DTR signal is active and the OR signal 103 is maintained at high level.

If the power control module 25 detects that the PSMR signal is active (T7), it determines the PSME signal. When the power control module 25 detects that the PSME signal is inactive (T7), it determines that the bus module 100 has disabled transition to the power-saving mode, and deactivates the PSMTR signal (T11), thereby canceling the power-saving mode transition request.

When the bus module 100 detects that the PSMTR signal is inactive (T12), it deactivates the PSMR signal (T15). Then, the bus module 100 activates the DTRR signal (T16), thereby canceling the non-reception state to continue the processing of the transfer data.

When New Transfer Data is Generated after Transition to Power-Saving Mode

The operation of the power control module 25 and bus module 100 when a new data transfer operation is performed after transition to the power-saving mode will be described with reference to FIG. 7 (time T2). Upon receiving a power-saving mode transition trigger, the power control module 25 activates the PSMTR signal (T2).

If the bus module 100 detects that the PSMTR signal is active (T3), it deactivates the DTRR signal (T4), and transits to the non-reception state to detect the processing state. When the bus module 100 detects the non-processing state (the absence of transfer data) (T5), it sets the signal 105 at low level to deactivate the PSME signal (T5), thereby activating the PSMR signal (T6).

Figure 7:
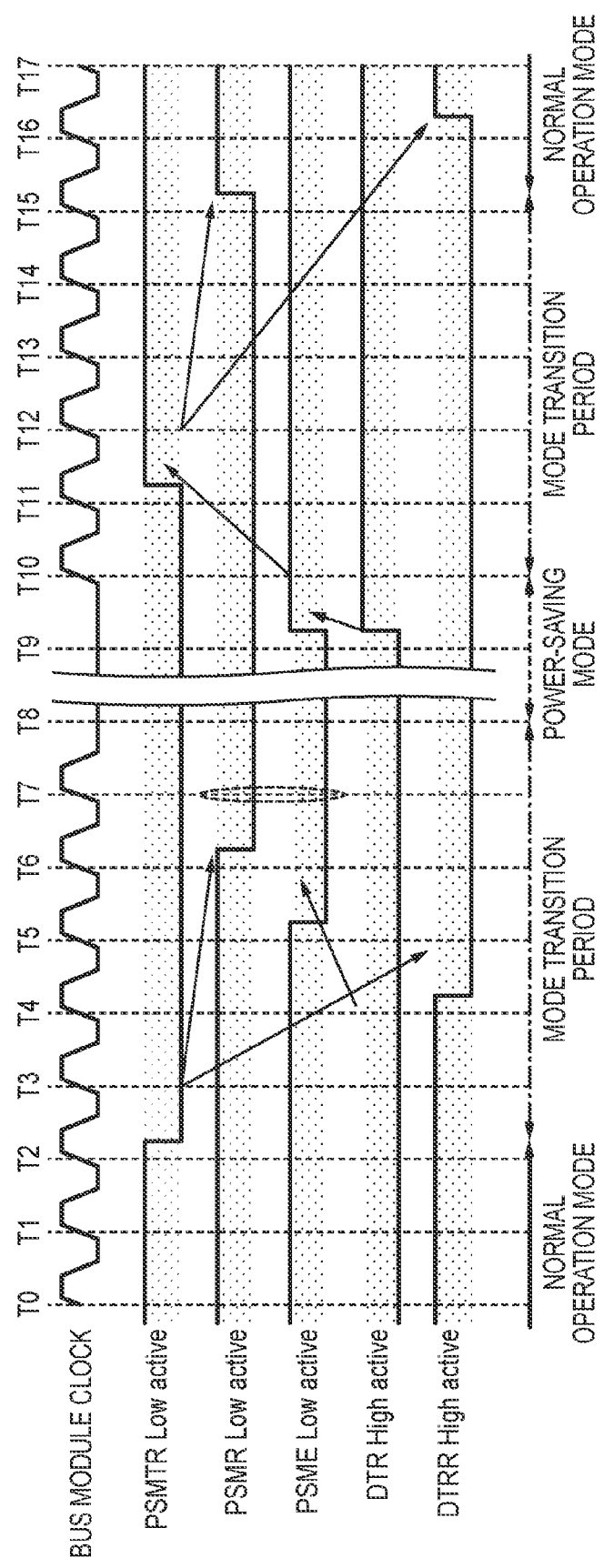
FIG. 7 is a timing chart for explaining the operation of the power control module and bus module when a new data transfer operation is performed after transition to the power-saving mode.

In the example shown in FIG. 7, since the DTR signal is inactive at time T5, the OR signal 103 is set at low level, thereby indicating the absence of new transfer data. As a result, both the OR signal 103 and the signal 105 are at low level, and the PSME signal output from the OR gate 104 is activated at time T5.

If the power control module 25 detects that the PSMR signal is active (T7), it determines the PSME signal. When the power control module 25 detects that the PSME signal is active (T7), it determines that the bus module 100 has enabled transition to the power-saving mode, and changes or interrupts the power supply and/or clock of the bus module 100 (T8 to T10).

In the example shown in FIG. 7, at time T9, new transfer data is generated, and the state of the DTR signal changes to the active state. Since the bus module 100 is in the power-saving mode, the signal 105 is maintained at low level at time T9 but the OR signal 103 output from the OR gate 102 of the data transfer detection module 101 is set at high level at time T9. As a result, the PSME signal output from the OR gate 104 is deactivated at time T9.

If the power control module 25 detects that the PSME signal being received is inactive (T10), it determines that cancellation of the power-saving mode of the bus module 100 is necessary. The power control module 25 supplies the clock and/or power of the bus module 100, and then deactivates the PSMTR signal (T11).

If the bus module 100 detects that the PSMTR signal is inactive (T12), it deactivates the PSMR signal (T15). Then, the bus module 100 activates the DTRR signal (T16), and cancels the non-reception state to start receiving new transfer data.

With the operation of the power control module 25 and bus module 100 shown in FIGS. 5 to 7, transition between the power-saving mode and the normal operation mode is implemented while avoiding freezing and loss of transfer data in the bus system 30 including the plurality of bus modules 100.

Power Control Module

As shown in FIG. 2A, the power control module 25 includes the power control I/Fs corresponding to the respective bus modules 100. Each power control I/F includes a control module 250 for controlling transition/returning to/from the power-saving mode, an interval timer 251 for measuring an interval time, and a timer-value optimization module 252 for optimizing the setting value of the interval time, and manages the state of the corresponding bus module 100.

Each control module 250 is implemented by a simple dedicated circuit connected to the interval timer 251, a programmable logic device (PLD), or the like. Alternatively, each control module 250 may be implemented when the CPU of the power control module 25 executes a program stored in the ROM of the power control module 25 or the like.

Figure 8A:
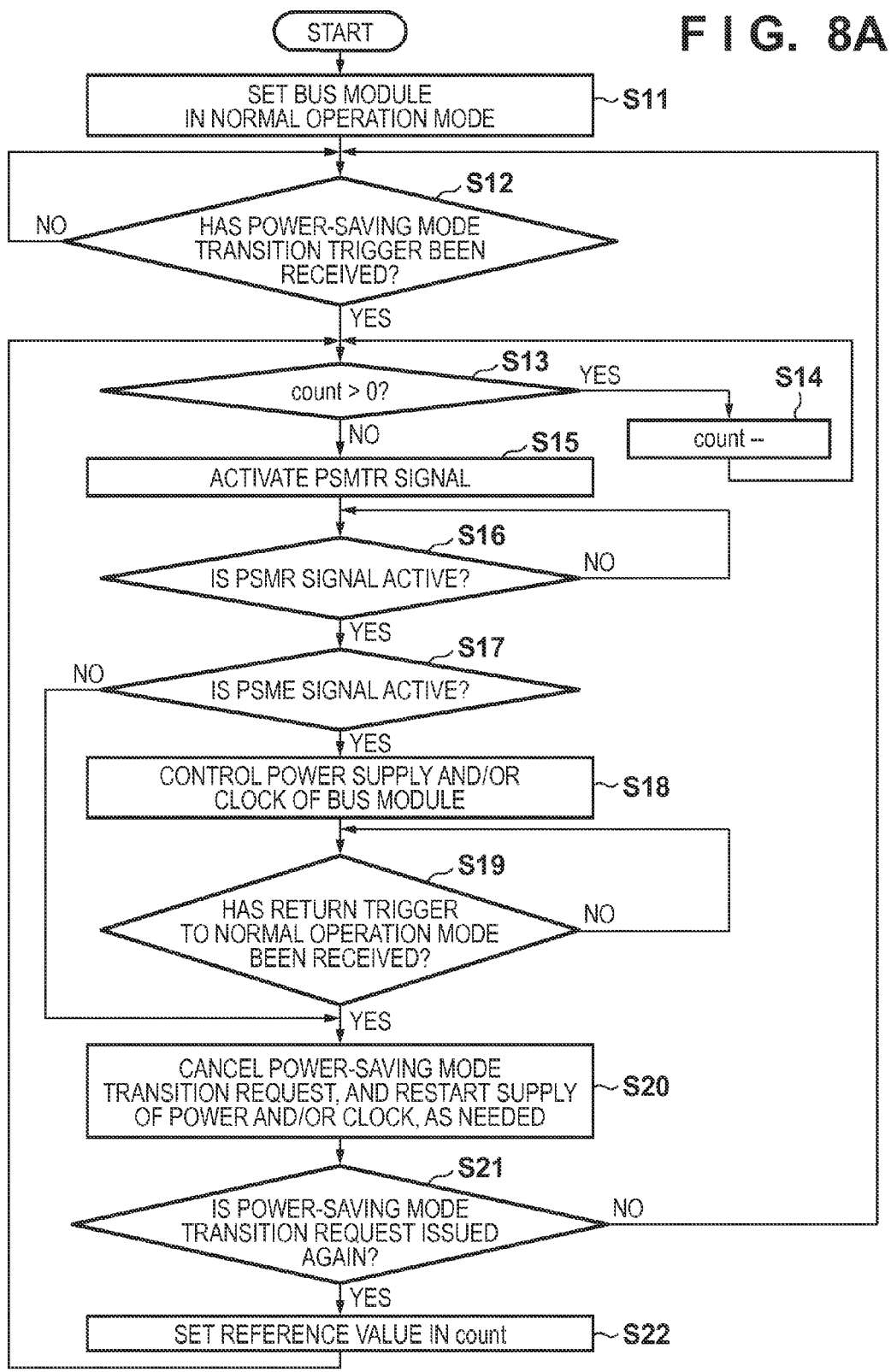
FIG. 8A is a flowchart for explaining processing by the control module.

FIG. 8A is a flowchart for explaining processing by the control module 250. When the power control module 25 starts to operate, the control module 250 supplies power and/or a clock to the bus module 100, thereby setting the bus module 100 in the normal operation mode (S11). At this time, the PSMTR signal is inactive.

The control module 250 determines whether a power-saving mode transition trigger has been received (S12). If no trigger has been received, the process returns to step S11, and the bus module 100 is maintained in the normal operation mode. Note that the power-saving mode transition trigger is an interrupt or access to a register by the CPU 10 or 11, an external event, or the like.

Upon receiving the power-saving mode transition trigger, the control module 250 determines the count value "count" of the interval timer 251 (S13). When the count value "count">0, the control module 250 decrements the count value "count" of the interval timer 251 (S14), and returns the process to step S13.

When the count value "count" of the interval timer 251 becomes 0 (the interval time elapses), the control module 250 activates the PSMTR signal (S15), and determines whether the bus module 100 enables transition to the power-saving mode. That is, determination of the PSMR signal (S16) and determination of the PSME signal (S17) are performed.

If the PSMR signal is activated (S16) and the PSME signal is activated (S17), the control module 250 determines that the bus module 100 has enabled transition to the power-saving mode. The control module 250 controls the power supply and/or clock of the bus module 100 (S18). Note that in consideration of the response performance and the return time from the power-saving mode to the normal operation mode, for example, the power supply is interrupted, the clock is interrupted, and/or the clock speed is changed. After that, the control module 250 advances the process to step S19, and stands by for a return trigger to the normal operation mode of the bus module 100.

After causing the bus module 100 to transit to the power-saving mode, the control module 250 determines whether a normal operation mode return trigger has been received (S19). There are some kinds of return triggers, which are an interrupt or access to a register by the CPU 10 or 11, an external event, and the like. If new transfer data is generated, since the bus module 100 is in the power-saving mode, the data transfer detection module 101 deactivates the PSME signal, which is one of the return triggers. Upon receiving a return trigger, the control module 250 advances the process to step S20.

On the other hand, if the PSMR signal is activated (S16) and the PSME signal is inactive (S17), the control module 250 determines that the bus module 100 disables transition to the power-saving mode, and advances the process to step S20. If transfer data being processed exists in the bus module 100 or new transfer data exists, the bus module 100 disables transition to the power-saving mode to avoid freezing and loss of the transfer data.

If a return trigger is received or transition to the power-saving mode is disabled, the control module 250 cancels the power-saving mode transition request. If supply of the power and/or clock to the bus module 100 is interrupted, the supply of the power and/or clock is restarted (S20). That is, to return from interruption of the power supply, after the power supply becomes stable, reset processing of the bus module 100 is performed. After that, the control module 250 deactivates the PSMTR signal, and confirms that the PSMR signal becomes inactive, thereby advancing the process to step S21.

The control module 250 determines whether to issue a power-saving mode transition request again (S21). If no power-saving mode transition request is issued, the control module 250 returns the process to step S12. If a power-saving mode transition request is issued, the control module 250 sets a predetermined reference value in the count value "count" of the interval timer 251 (S22), and returns the process to step S13.

The above processing by the control module 250 can reduce a procedure associated with power control by the master module 300 such as the CPU 10.

Timer-Value Optimization Module

Figure 8B:
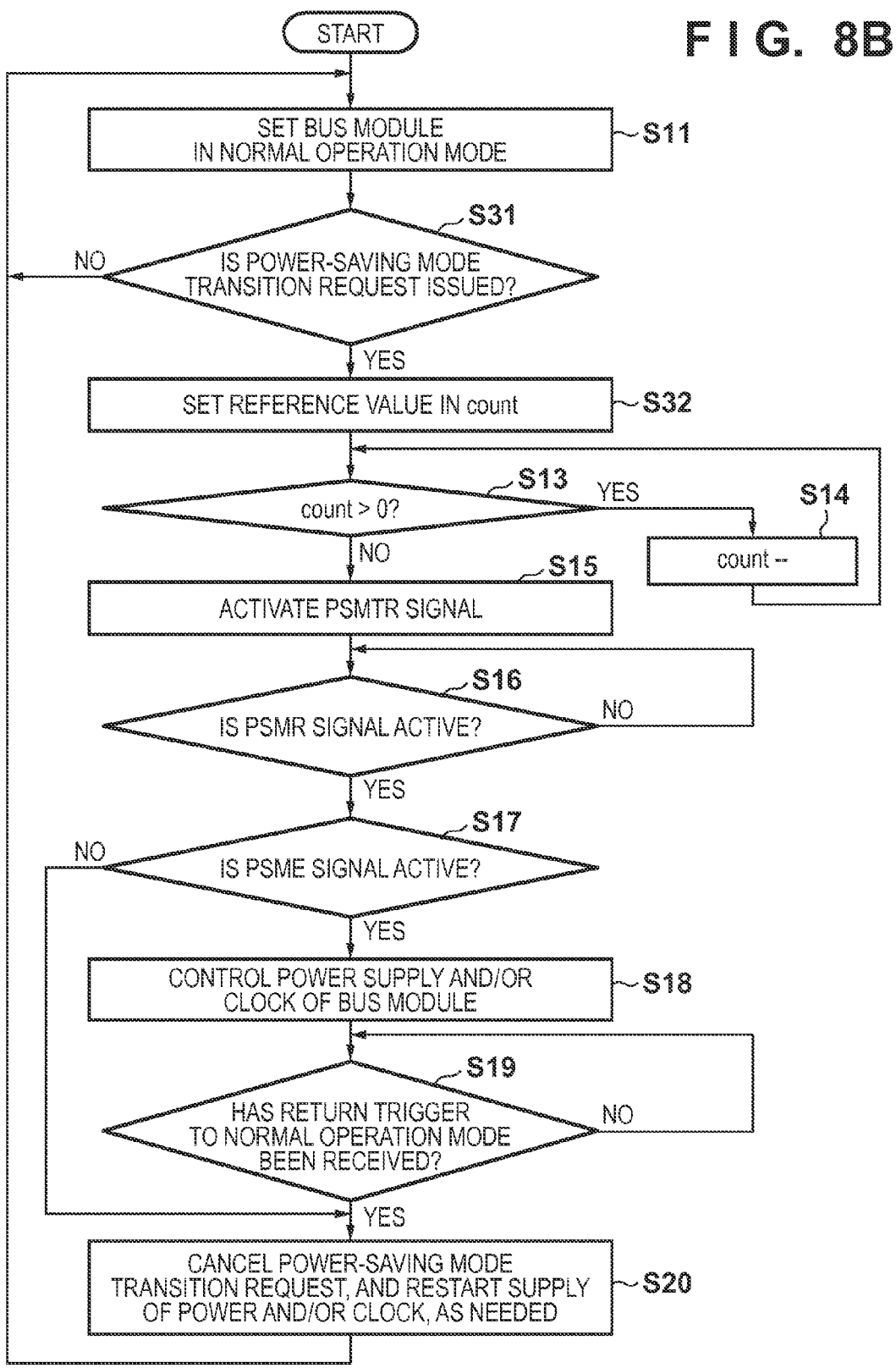
FIG. 8B is a flowchart for explaining processing by the control module, which includes the operation of a timer-value optimization module.

The timer-value optimization module 252 is a module for dynamically changing the timer value based on a predetermined rule, and adjusting the timer value to an optimum timer value. FIG. 8B is a flowchart for explaining processing by the control module 250, which includes the operation of the timer-value optimization module 252. Note that in FIG. 8B, the same reference symbols as those in FIG. 8A denote the same processes and a description thereof will be omitted.

When the power control module 25 starts to operate, the control module 250 supplies a clock and/or power to the bus module 100 to set the bus module 100 in the normal operation mode (S11). At this time, the PSMTR signal is inactive.

The control module 250 determines whether to issue a power-saving mode transition request (S31). If no power-saving mode transition request is issued, the control module 250 returns the process to step S11, and maintains the normal operation mode of the bus module 100. Whether to issue a power-saving mode transition request may be determined based on an interrupt or access to a register by the CPU 10, or an external trigger such as an external event, or may be autonomously determined by the control module 250 based on its internal state.

If the control module 250 issues a power-saving mode transition request, it sets a predetermined reference value (time setting value) notified from the timer-value optimization module 252 in the count value "count" of the interval timer 251 (S32). The control module 250 executes processes from determination of the count value "count" of the interval timer 251 (S13) to cancellation of the power-saving mode transition request (S20), which are the same as those in FIG. 8A and a detailed description thereof will be omitted. Note that unlike the processing shown in FIG. 8A, in the processing shown in FIG. 8B, after canceling the power-saving mode transition request (S20), the process returns to step S11.

The above processing by the control module 250 including the timer-value optimization module 252 can reduce the procedure associated with power control by the master module 300 such as the CPU 10.

Count Value of Interval Timer

The relationship between the power control signals and the count value "count" of the interval timer 251 will be described with reference to FIG. 9.

A case in which after the PSMTR signal is activated, the PSMR signal becomes active but the PSME signal does not become active corresponds to a case in which the bus module 100 disables transition to the power-saving mode, as described above. In this case, the power control module 25 deactivates the PSMTR signal. After the time set in the interval timer 251 elapses, the power control module 25 activates the PSMTR signal again. That is, the power control module 25 issues a power-saving mode transition request at an interval set in the interval timer 251 without intervention of the CPU 10 or 11.

During a mode transition period for avoiding freezing and loss of data, the bus module 100 determines whether it is possible to transit to the power-saving mode, and notifies, if transition is possible, the power control module 25 of it. Only if transition to the power-saving mode is possible, the power control module 25 can control the power supply and/or clock, thereby saving the power of the bus module 100.

The power control module 25 includes a plurality of interval timers 251 in correspondence with the plurality of bus modules 100. The value of each interval timer 251 is set in advance according to a transfer performance request of the bus module 100 to be controlled. A smaller value is set in the interval timer 251 corresponding to the bus module 100 whose data transfer capability is low, for example, whose requirement for a transfer bandwidth is low, thereby increasing opportunities to transit to the power-saving mode.

On the other hand, a larger value is set in the interval timer 251 corresponding to the bus module 100 whose requirement for a transfer bandwidth is high, thereby decreasing opportunities to decrease the effective performance during the power-saving mode transition period. Similarly, the value of the interval timer 251 may be set in consideration of a request for transfer latency in addition to the request for the transfer bandwidth. That is, it is possible to obtain the optimum balance between the power consumption and the effective performance of transfer in consideration of the use conditions of each bus module 100.

To make an input value to the interval timer 251 appropriate as described above, the timer-value optimization module 252 arranged in the power control module 25 is used to dynamically change the timer setting value of the interval timer 251. Then, a timer setting value with a high power-saving effect as a determination index is searched for.

For example, in an example to be described later, while the information processing apparatus 201 for the digital camera system performs processing such as moving image shooting, the timer-value optimization module 252 automatically adjusts a timer setting value to be set in each interval timer 251. With this processing, it is possible to automatically adjust an optimum timer value with a high power-saving effect in accordance with each device state such as an operation standby state or the moving image shooting mode of the information processing apparatus 201 for the digital camera system.

[Timer-Value Optimization Module]

The timer-value optimization module 252 is a module for dynamically changing the timer setting value of the interval timer 251, searching for and determining a timer setting value with a high power-saving effect, and inputting, after completion of the search operation, an optimum timer setting value with a highest power-saving effect as a determination result to the interval timer 251.

Figure 10:
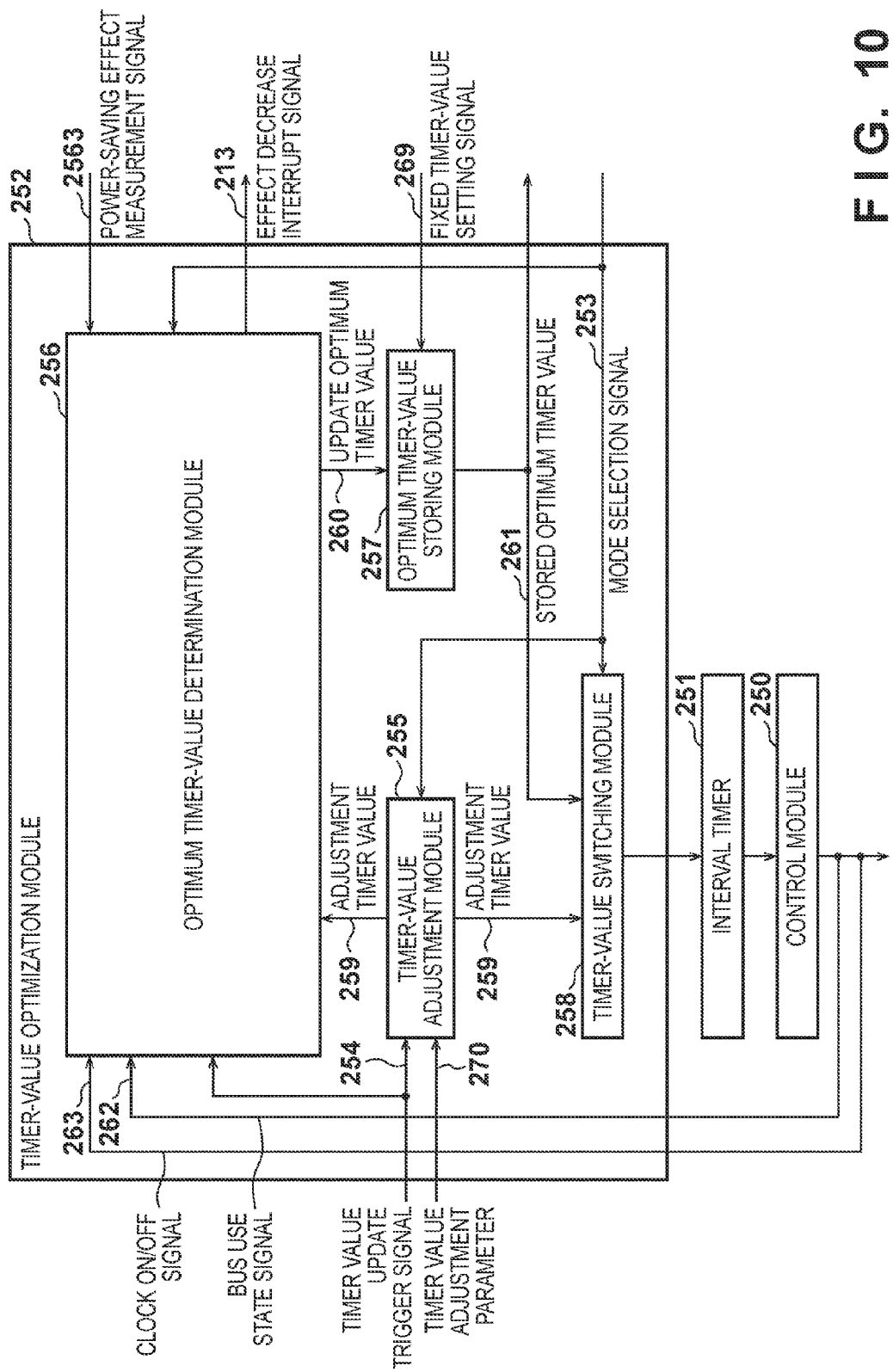
FIG. 10 is a block diagram showing the internal arrangement of the timer-value optimization module.

FIG. 10 is a block diagram showing the internal arrangement of the timer-value optimization module 252. The timer-value optimization module 252 includes a timer-value adjustment module 255, an optimum timer-value determination module 256, an optimum timer-value storing module 257, and a timer-value switching module 258.

As the input/output signals of these modules, there exist a mode selection signal 253 for selecting a timer-value adjustment mode or a mode (to be referred to as an "adjusted timer-value use mode" hereinafter) in which an adjusted timer value is used, a timer-value update trigger signal 254, timer-value adjustment parameters 270, and a power-saving effect measurement signal 2563 for the optimum timer value. There are also an adjustment timer value 259, an update optimum timer value 260, a stored optimum timer value 261, a fixed timer-value setting signal 269, an effect decrease interrupt signal 213 indicating a decrease in power-saving effect, a bus use state signal 262, and a clock ON/OFF signal 263.

The timer-value optimization module 252 will be described in detail below. The CPU 10 uses the mode selection signal 253 to select whether to adjust the timer value, and notifies the timer-value adjustment module 255, optimum timer-value determination module 256, and timer-value switching module 258 of the selection result. When the value of the mode selection signal 253 is "1", the timer-value adjustment mode is indicated. Alternatively, when the value is "0", the adjusted timer-value use mode is indicated.

In the timer-value adjustment mode, the adjustment timer value 259 output from the timer-value adjustment module 255 is selected. In the adjusted timer-value use mode, the stored optimum timer value 261 output from the optimum timer-value storing module 257 is selected. The selected timer value is sent, as a timer setting value, to the external interval timer 251 through the timer-value switching module 258.

The timer-value update trigger signal 254 is controlled by the CPU 10, and notifies the timer-value adjustment module 255 and optimum timer-value determination module 256 of an adjustment timer-value update timing. In this embodiment, the output of the timer-value update trigger signal 254 is a 1-cycle pulse signal. When the value of the pulse signal is "1", an adjustment timer-value update timing is indicated.

The adjustment timer value 259 is the output signal of the timer-value adjustment module 255, and the operation of the output signal will be described in combination of the operation of the timer-value adjustment module 255 (to be described later). The update optimum timer value 260 is the output signal of the optimum timer-value determination module 256, and the operation of the output signal will be explained in combination with the operation of the optimum timer-value determination module 256 (to be described later). The stored optimum timer value 261 is the output signal of the optimum timer-value storing module 257, and the operation of the output signal will be explained in combination with the operation of the optimum timer-value storing module 257 (to be described later).

The bus use state signal 262 includes the power control signals (PSMTR signal, PSMR signal, and PSME signal) to be used between the control module 250 and the bus module 100, and the handshake control signals (DTR signal and DTRR signal) of the bus module 100, and its detailed operation will be described with reference to FIGS. 5, 6, and 7.

The clock ON/OFF signal 263 is a signal used by the control module 250 to control supply/stop of the clock of the bus module 100. The clock signal generated by the clock generator (not shown) is supplied to the clock port of the bus module 100 through a clock gating circuit (not shown) for masking the clock signal by the clock ON/OFF signal 263.

In the timer-value adjustment mode instructed by the mode selection signal 253, when the timer-value update trigger signal 254 is active, the timer-value adjustment module 255 automatically updates the adjustment timer value, and outputs the updated timer value to the interval timer 251. A method of updating the timer value at this time complies with the timer-value adjustment parameters 270 (time setting value adjustment parameters) to be input.

In this embodiment, as the timer-value adjustment parameters 270, three parameters including a start timer value, step value (initial setting value), and timer update count (update count) are used. The adjustment timer value 259 to be output to the interval timer 251 is updated every time the timer-value update trigger signal 254 is input. An update rule is as follows.

if(first input of timer-value update trigger)adjustment timer value = start timer value;

if(second input of timer-value update trigger)adjustment timer value = start timer value + step value × 1;

if(third input of timer-value update trigger)adjustment timer value = start timer value + step value × 2;

⋮

⋮ if($Nth$ input of timer-value update trigger)adjustment timer value = start timer value + step value × ($N$ + 1);

Note that the above method of adjusting the adjustment timer value 259 is merely an example, and a method of more intelligently searching for the optimum value of the adjustment timer value 259 may be adopted. A use example of the adjustment timer value 259 will be described in detail later.

A case in which the timer-value adjustment parameters 270 are externally input and the timer-value adjustment module 255 updates the adjustment timer value 259 according to the parameters has been explained above. As another method, however, an external module may input the adjustment timer value 259 together with the timer-value update trigger signal 254.

If the mode selection signal 253 selects the timer-value adjustment mode, the adjustment timer value 259 output from the timer-value adjustment module 255 is used as the timer setting value of the interval timer 251. At the same time, the optimum timer-value determination module 256 is notified of the adjustment timer value 259.

In the timer-value adjustment mode indicated by the mode selection signal 253, the optimum timer-value determination module 256 measures the power-saving effect of the bus module 100 for each adjustment timer value 259 output from the timer-value adjustment module 255. Upon the end of the timer-value adjustment mode, the adjustment timer value 259 with the highest one of the measured power-saving effects is determined, and stored in the optimum timer-value storing module 257. The optimum timer-value determination module 256 measures the power-saving effect of the bus module 100 based on the states of the bus use state signal 262 and clock ON/OFF signal 263.

The optimum timer-value storing module 257 is a module for storing the optimum timer value with which the highest power-saving effect is obtained, and notifying the interval timer 251 of the stored optimum timer value in the adjusted timer-value use mode indicated by the mode selection signal 253.

When entering the adjusted timer-value use mode by the mode selection signal 253, the optimum timer-value storing module 257 updates the stored optimum timer value based on the output result of the optimum timer-value determination module 256.

If the mode selection signal 253 indicates the timer-value adjustment mode (mode selection signal="1"), the timer-value switching module 258 selects the adjustment timer value 259 output from the timer-value adjustment module 255. If the mode selection signal 253 indicates the adjusted timer-value use mode (mode selection signal="0"), the timer-value switching module 258 selects the stored optimum timer value 261 output from the optimum timer-value storing module 257. The timer-value switching module 258 then outputs the selected timer value to the interval timer 251.

In a mode except for the timer-value adjustment mode, if it is desirable to output a predetermined timer setting value to the interval timer 251, it is possible to rewrite the optimum timer value in the optimum timer-value storing module 257 using the fixed timer-value setting signal 269. The fixed timer-value setting signal 269 is formed from a fixed timer setting value and its write control signal. If the write control signal of the fixed timer setting value is active, the fixed timer setting value is processed as effective data.

The power-saving effect measurement signal 2563 and effect decrease interrupt signal 213 shown in FIG. 10 will be described in detail later.

Optimum Timer-Value Determination Module

The optimum timer-value determination module 256 determines the power-saving effect of the bus module 100 according to:

power-saving effect=total period of power-saving mode periods−total period of power-saving mode transition periods   (1)

The power-saving mode period is a period during which the clock of the bus module 100 is stopped. The power-saving mode transition period is a period during which a power-saving mode transition request is issued to the bus module 100 but the clock of the bus module 100 is not stopped. Therefore, as the calculation result of equation (1) is larger, the power-saving effect is higher. The calculation result of equation (1) may take a negative value. Equation (1) for calculating the power-saving effect is merely an example, and another calculation method may be used.

There are three kinds of power-saving mode transition. The first transition is mode transition from the normal operation mode to the power-saving mode (corresponding to the first mode transition in the case shown in FIG. 7). The second transition is mode transition from the power-saving mode to the normal operation mode (corresponding to the second mode transition in the case shown in FIG. 7). The third transition is transition between normal operation modes (corresponding to the case shown in FIG. 6). The above-described "power-saving mode transition period" represents the total sum of the respective mode transition periods.

Figure 11:
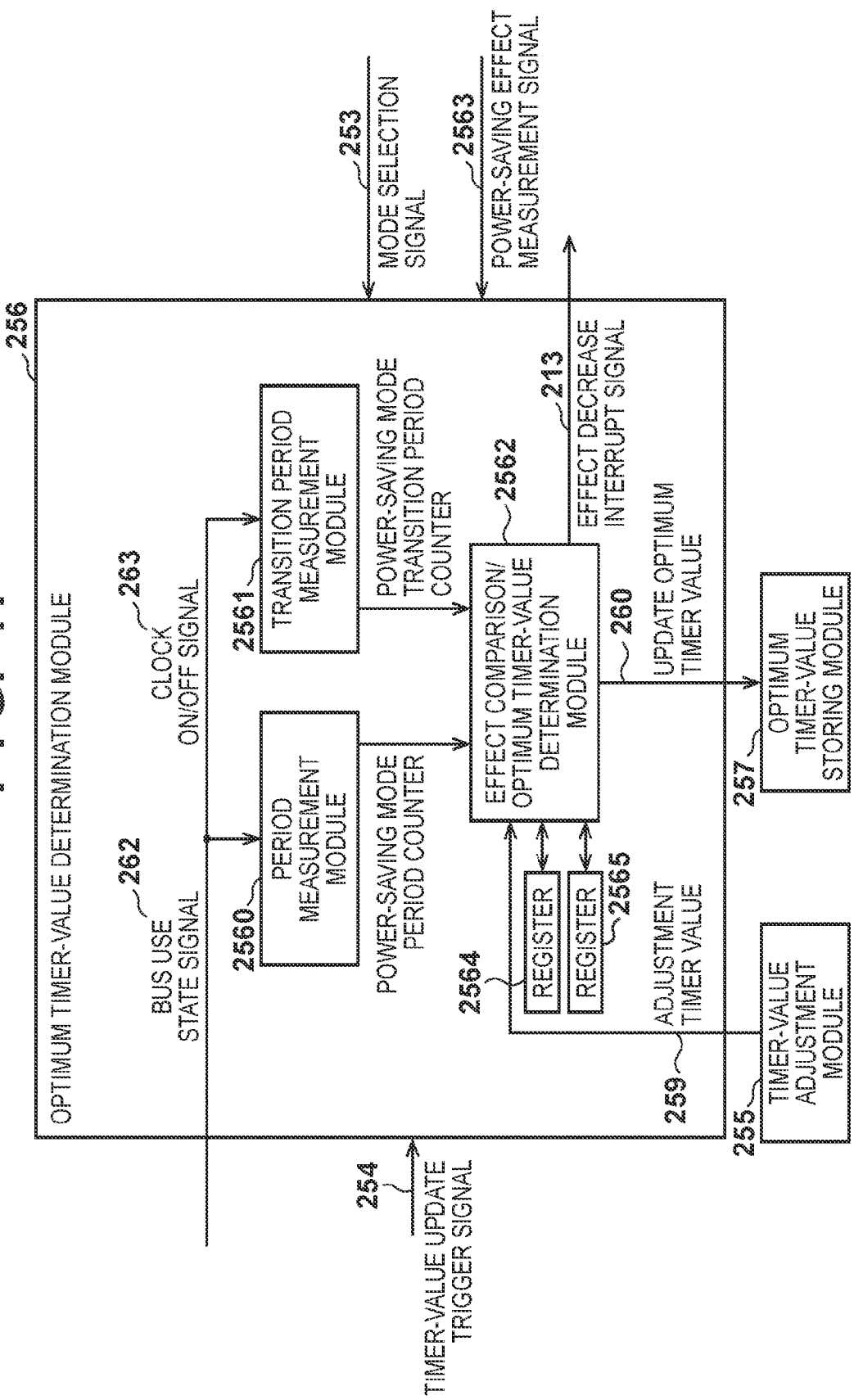
FIG. 11 is a block diagram showing the arrangement of an optimum timer-value determination module.

FIG. 11 is a block diagram showing the arrangement of the optimum timer-value determination module 256. The optimum timer-value determination module 256 includes a period measurement module 2560, a transition period measurement module 2561, and an effect comparison/optimum timer-value determination module 2562. The operation of these modules will be described in detail below.

The period measurement module 2560 is formed from a counter (power-saving mode period counter). During the timer-value adjustment mode notified by the mode selection signal 253, the period measurement module 2560 measures the total sum of power-saving mode periods, and notifies the effect comparison/optimum timer-value determination module 2562 of the measurement result as "the total period of the power-saving mode periods".

The transition period measurement module 2561 is formed from a counter (power-saving mode transition period counter). During the timer-value adjustment mode notified by the mode selection signal 253, the transition period measurement module 2561 measures the total sum of the power-saving mode transition periods, and notifies the effect comparison/optimum timer-value determination module 2562 of the measurement result as "the total period of the power-saving mode transition periods".

Upon the end of the timer-value adjustment mode notified by the mode selection signal 253, the effect comparison/optimum timer-value determination module 2562 performs the following operation. That is, the effect comparison/optimum timer-value determination module 2562 subtracts the counter value (the total period of the power-saving mode transition periods) notified from the transition period measurement module 2561 from the count value (the total period of the power-saving mode periods) notified from the period measurement module 2560. The effect comparison/optimum timer-value determination module 2562 latches the value of the measurement result in synchronism with the timer-value update trigger signal 254, and uses the value as a determination index (to be referred to as an "effect determination signal" hereinafter) indicating the power-saving effect. Note that although not shown in FIG. 11, the effect determination signal is described in FIGS. 12A and 12B (to be described later).

The effect comparison/optimum timer-value determination module 2562 compares the values of the effect determination signals for the respective adjustment timer values 259 while the mode selection signal 253 is active. As a result of the comparison operation, the effect comparison/optimum timer-value determination module 2562 stores, in the optimum timer-value storing module 257, as an optimum timer value with the highest power-saving effect, the adjustment timer value 259 for which the value of the effect determination signal is largest.

The effect comparison/optimum timer-value determination module 2562 stores the adjustment timer value 259 and the effect determination signal during the timer-value adjustment mode, and externally outputs the adjustment timer value 259 with the highest power-saving effect. A circuit arrangement method for this is not specifically limited.

For example, an arrangement is considered in which the adjustment timer value 259 and the effect determination signal during the timer-value adjustment mode are stored, and a selector is used to output the adjustment timer value 259 with the highest power-saving effect upon the end of the timer-value adjustment mode. In this arrangement, however, as the number of adjustment timer values 259 is larger, the circuit scale increases to store the values.

As another arrangement, only the adjustment timer value 259 whose closest effect determination signal has the largest value and the effect determination signal are temporarily stored. In this case, every time the timer-value update trigger signal 254 is input, the following operation is performed. That is, the magnitude of the effect determination signal of the latest adjustment timer value 259 is compared with that of the stored effect determination signal. If the value of the latest effect determination signal is larger, the stored adjustment timer value 259 and power-saving effect determination signal are updated by the latest adjustment timer value 259 and its power-saving effect determination signal.

Power-Saving Effect Measurement Signal and Effect Decrease Interrupt Signal

Measurement of the power-saving effect for the optimum timer value is a function used when the mode selection signal 253 is inactive (adjusted timer-value use mode). If the power-saving effect measurement signal 2563 indicates "1", the period measurement module 2560, transition period measurement module 2561, and effect comparison/optimum timer-value determination module 2562 operate to measure the power-saving effect. With this processing, even if the mode selection signal 253 is inactive, the power-saving effect is calculated every time the timer-value update trigger signal 254 is input. Note that a timer setting value used in this case is a predetermined optimum timer value, and the power-saving effect is calculated every time the timer-value update trigger signal 254 for the optimum timer value is input.

The effect comparison/optimum timer-value determination module 2562 stores the value of the power-saving effect for the optimum timer value in the timer-value adjustment mode. After transiting to the adjusted timer-value use mode, the effect comparison/optimum timer-value determination module 2562 compares the value (measurement value) of the power-saving effect continuously measured for the optimum timer value with the value (stored value) of the stored power-saving effect. When the measurement value is halved with respect to the stored value, the effect decrease interrupt signal 213 is asserted. Note that the effect decrease interrupt signal 213 may be asserted not only when the power-saving effect is halved but also when the measurement value becomes smaller than the threshold (for example, 70%) of the stored value, which has been set in advance. A use example of the effect decrease interrupt signal 213 will be described later.

Power-Saving Effect Measurement Method

Figure 12A:
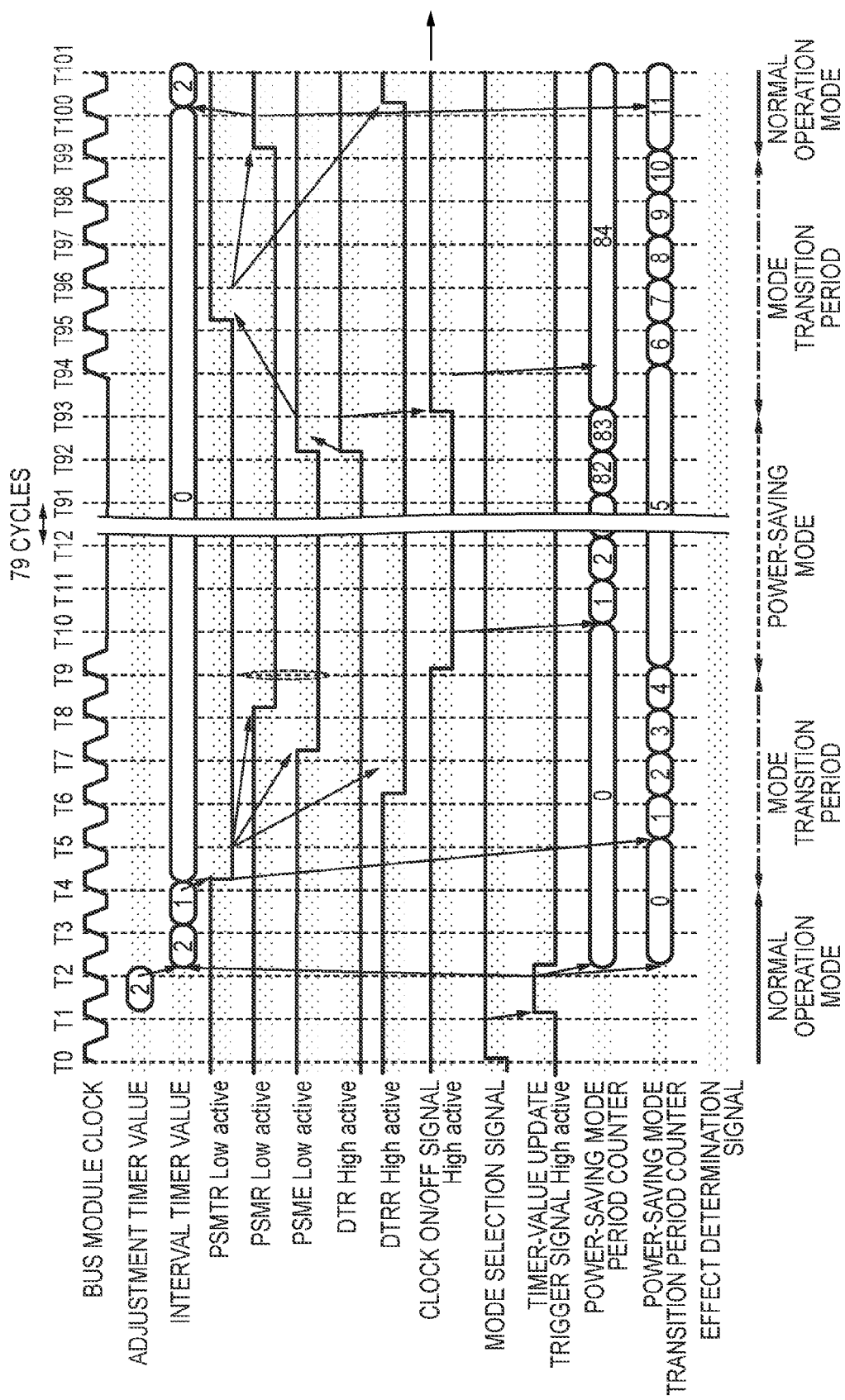

A power-saving effect measurement method will be described with reference to FIGS. 12A and 12B. While the mode selection signal 253 is asserted (high signal level), the interval timer 251 periodically asserts the PSMTR signal (low signal level). A time (a power-saving mode period) during which the power-saving mode is set and a time (a power-saving mode transition period) during which a clock is needlessly supplied during mode transition are counted. After that, the power-saving effect is calculated based on the calculation results of both the counters. FIGS. 12A and 12B show the above sequence.

To start adjustment of the timer value, the CPU 10 activates the mode selection signal 253 (low signal level) (time T0). The mode selection signal 253 is a level signal, and is fixed to be active all the time during a period (not shown) from time T0 until the CPU 10 instructs to end the timer-value adjustment mode. During this period, the timer-value switching module 258 selectively outputs, to the interval timer 251, the adjustment timer value 259 output from the timer-value adjustment module 255.

Simultaneously with activation of the timer-value update trigger signal 254, the CPU 10 sets the adjustment timer value 259 synchronized to it in the timer-value adjustment module 255, thereby notifying the timer-value adjustment module 255 of update of the adjustment timer value 259. In the example shown in FIGS. 12A and 12B, the adjustment timer value 259 at the time of the first timer adjustment operation is assumed to be "2" and the adjustment timer value 259 at the time of the second timer adjustment operation is assumed to be "4". The adjustment timer value 259 is loaded to the interval timer 251, which is then counted down every cycle until the count value becomes "0".

To notify the timer-value optimization module 252, the CPU 10 activates the timer-value update trigger signal 254 (T1). When the timer-value update trigger signal 254 is activated, the value of the power-saving mode period counter which is output from the period measurement module 2560 is reset to 0 (T2). At the same time, the value of the power-saving mode transition period counter which is output from the transition period measurement module 2561 is reset to 0 (T2).

The interval timer 251 to which the adjustment timer value 259 has been loaded starts counting down. When the count value becomes 1, the PSMTR signal is activated (T4). If the bus module 100 detects that the PSMTR signal is active (T5), it deactivates the DTRR signal (T6), and transits to the non-reception state to detect the processing state.

When the bus module 100 detects the non-processing state (the absence of transfer data) (T6), it sets the signal 105 at low level to activate the PSME signal (T7), and activates the PSMR signal (T8).

In the example shown in FIGS. 12A and 12B, since the DTR signal is inactive, the OR signal 103 is set at low level, thereby indicating the absence of new transfer data. As a result, both the OR signal 103 and the signal 105 are at low level, and the PSME signal output from the OR gate 104 is set at low level (activated) at time T7.

When the power control module 25 detects that the PSMR signal is active (T9), it determines the PSME signal. When the power control module 25 detects that the PSME signal is active (T9), it determines that the bus module 100 has enabled transition to the power-saving mode, and deactivates the clock ON/OFF signal 263, thereby instructing to stop supplying the clock (T9). After that, the clock ON/OFF signal 263 is inactive during a period of 85 cycles (T9 to T92), thereby stopping the clock during a period of 85 cycles (T10 to T93).

Supply of the bus module clock is controlled by the clock ON/OFF signal 263. When the clock ON/OFF signal 263 is active, the clock is supplied (ON). Alternatively, when the clock ON/OFF signal 263 is inactive, supply of the clock is stopped (OFF). A clock gating circuit (not shown) controls ON/OFF of the bus module clock at a timing one cycle after the clock ON/OFF signal 263 changes.

The power-saving mode period counter is incremented by +1 for each cycle during a period in which the power-saving mode is set to stop the clock (the clock ON/OFF signal 263 is at low level), or is maintained otherwise.

During a mode transition period from the normal operation mode to the power-saving mode, the power-saving mode transition period counter is incremented by +1 for each cycle. Note that the mode transition period is a time from when the PSMTR signal is activated until the PSMR signal changes from the inactive state to the active state. During a period except for the mode transition period and a period in which the clock ON/OFF signal 263 is inactive even in the mode transition period, the count value of the power-saving mode transition period counter is held.

At time T92, new transfer data is generated, and the state of the DTR signal changes to be active. In response to this, the clock ON/OFF signal 263 is activated at time T93, and supply of the clock is restarted at time T94.

Since the bus module 100 is in the power-saving mode, the signal 105 is maintained at low level at time T92 but the OR signal 103 output from the OR gate 102 of the data transfer detection module 101 is set at high level at time T92. As a result, the PSME signal output from the OR gate 104 is deactivated at time T92.

When the power control module 25 detects that the PSME signal being received is inactive (T93), it determines that it is necessary to cancel the power-saving mode of the bus module 100. After supply of the power and/or clock of the bus module 100 is restarted, the PSMTR signal is deactivated (T95).

When the bus module 100 detects that the PSMTR signal is inactive (T96), it deactivates the PSMR signal (T99). After that, the bus module 100 activates the DTRR signal (T100), and cancels the non-reception state to enter a state in which transfer data is newly received.

When the first power-saving mode transition request is issued and the DTRR signal is deactivated and then activated again (T100), the value of the power-saving mode period counter is "84" and the value of the power-saving mode transition period counter is "11".

The PSMTR signal is activated again (T102), and the DTRR signal is deactivated (T104). As a result, at time T107, the PSMR signal and PSME signal are activated. At time T107, however, since the DTR signal is active, the power control module 25 determines that it is impossible to transit to the power-saving state. The PSMTR signal is deactivated while keeping the clock ON/OFF signal 263 inactive (T111). As a result, the PSMR signal is deactivated at time T115, and the DTRR signal is activated at time T116.

At this time, since the clock ON/OFF signal 263 is kept inactive during a period of the second power-saving mode transition request from time T102 to time T115, the value of the power-saving mode period counter is held as "85". On the other hand, the power-saving mode transition period counter is incremented by +1 for each cycle during a period from time T103 to time 115, and the count value at time T115 is "25". This indicates that there is no power-saving effect for the second power-saving mode transition request, and only processing cycle overhead associated with transition occurs.

When the CPU 10 activates the timer-value update trigger signal 254 again, the adjustment timer value 259 synchronized to it is set at the same time. This causes the power control module 25 to start issuing a power-saving mode transition request by supplying the new adjustment timer value 259 to the interval timer 251.

When the CPU 10 activates the timer-value update trigger signal 254, the adjustment timer value 259 synchronized to it is set (T117). At the same time, the effect comparison/optimum timer-value determination module 2562 calculates the power-saving effect of the first timer-value adjustment operation based on the power-saving mode period counter and the power-saving mode transition period counter. The calculation value is stored, as an effect determination signal, in a register 2564 for temporarily storing the power-saving effect (T118). At the same time, the adjustment timer value 259 at this time is stored in a register 2565 for temporarily storing the time setting value. Note that the registers 2564 and 2565 are the internal registers of the effect comparison/optimum timer-value determination module 2562. The effect comparison/optimum timer-value determination module 2562 includes interval registers, the number of which is equal to the timer update count, and can hold the adjustment timer values 259 corresponding to the effect determination signals, the number of which is equal to the timer update count.

As indicated by equation (1), the result of subtracting the power-saving mode transition period counter value from the power-saving mode period counter value indicates the power-saving effect. In the above example, the value of the effect determination signal is 85−25=60. Note that the value of the effect determination signal can take not only a positive integer but also a negative integer. If the value is negative, the time taken to transit to the power-saving mode is longer than the time during which the clock can be stopped to suppress the power, thereby indicating a poor power-saving effect.

Although not shown in FIGS. 12A and 12B, the CPU 10 deactivates the mode selection signal 253 to complete adjustment of the timer value. After that, the effect comparison/optimum timer-value determination module 2562 compares the magnitudes of the values of the registers each for temporarily storing the power-saving effect for each adjustment timer value (power-saving effect comparison). The adjustment timer value 259 stored in the register for temporarily storing the adjustment value, which corresponds to the maximum value of the effect determination signal stored in the register for temporarily storing the power-saving effect, is selected. The selected adjustment timer value 259 is stored in the optimum timer-value storing module 257 as an optimum timer value with the highest power-saving effect.

After adjustment of the timer value ends and the optimum timer value is decided, the timer-value switching module 258 selectively outputs, to the interval timer 251, the stored optimum timer value 261 during a cycle in which the mode selection signal 253 is inactive.

[Setting Register]

The setting register 800 shown in FIG. 2B includes an interface used by the CPU 10 to access the internal register group. The CPU 10 instructs the timer-value optimization module 252 through the setting register 800. Note that the setting register 800 may exist in the timer-value optimization module 252.

Figure 13:
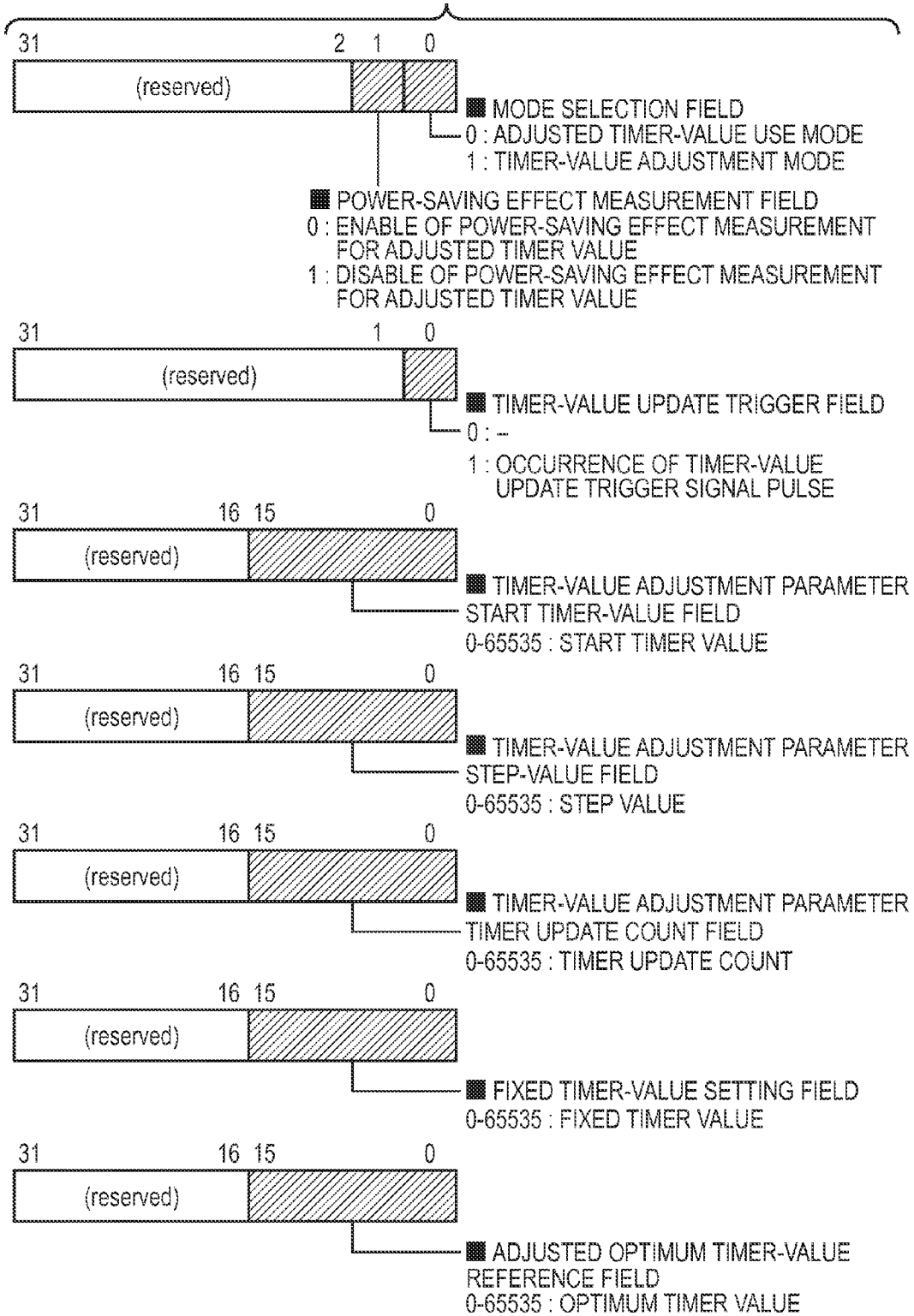
FIG. 13 is a view showing seven 32-bit registers existing in a setting register.

FIG. 13 shows seven 32-bit registers existing in the setting register 800. Addresses which can be specified by the CPU 10 are assigned to each register (not shown), and the CPU 10 can read/write data from/in the register.

In the first register, a 1-bit mode selection field and 1-bit power-saving effect measurement field exist. In the second register, a 1-bit timer-value update trigger field exists. In each of the third to fifth registers, a 16-bit timer-value adjustment parameter field (start timer value, step value, and timer update count) exists. In the sixth register, a 16-bit fixed timer-value setting field exists. In the seventh register, a 16-bit adjusted optimum timer-value reference field exists.

The mode selection field is a readable/writable register, and a register field directly coupled to the mode selection signal 253. The power-saving effect measurement field is a readable/writable register, and a register field directly coupled to the power-saving effect measurement signal 2563.

The timer-value update trigger field is a register field in which only "1" can be written. The 1-pulse timer-value update trigger signal 254 to be supplied to the timer-value optimization module 252 can be generated by writing "1". When "1" is written, the timer-value update trigger field is automatically cleared to "0", thereby entering a next write access standby state.

The 16-bit timer-value adjustment parameter field (start timer value, step value, and timer update count) is a readable/writable register field. The timer-value adjustment parameter field is a register field directly coupled to the timer-value adjustment parameters 270 to be supplied to the timer-value optimization module 252.

The 16-bit fixed timer-value setting field is a register field for inputting a fixed value to the interval timer 251 when adjustment of the timer value is not used. When write access is made to the fixed timer-value setting field, a write control signal of the fixed timer setting value as part of the fixed timer-value setting signal 269 is activated. At the same time, the value of the fixed timer-value setting field is output as the fixed timer setting value as part of the fixed timer-value setting signal 269. This makes it possible to rewrite the optimum timer value of the optimum timer-value storing module 257 of the timer-value optimization module 252.

The 16-bit adjusted optimum timer-value reference field is a register field which is updated when timer value adjustment is completed, and stores the stored optimum timer value 261. The adjusted optimum timer-value reference field is a read only register which can be read by the CPU 10.

[Decision and Use of Optimum Timer Value]

Figure 14A:
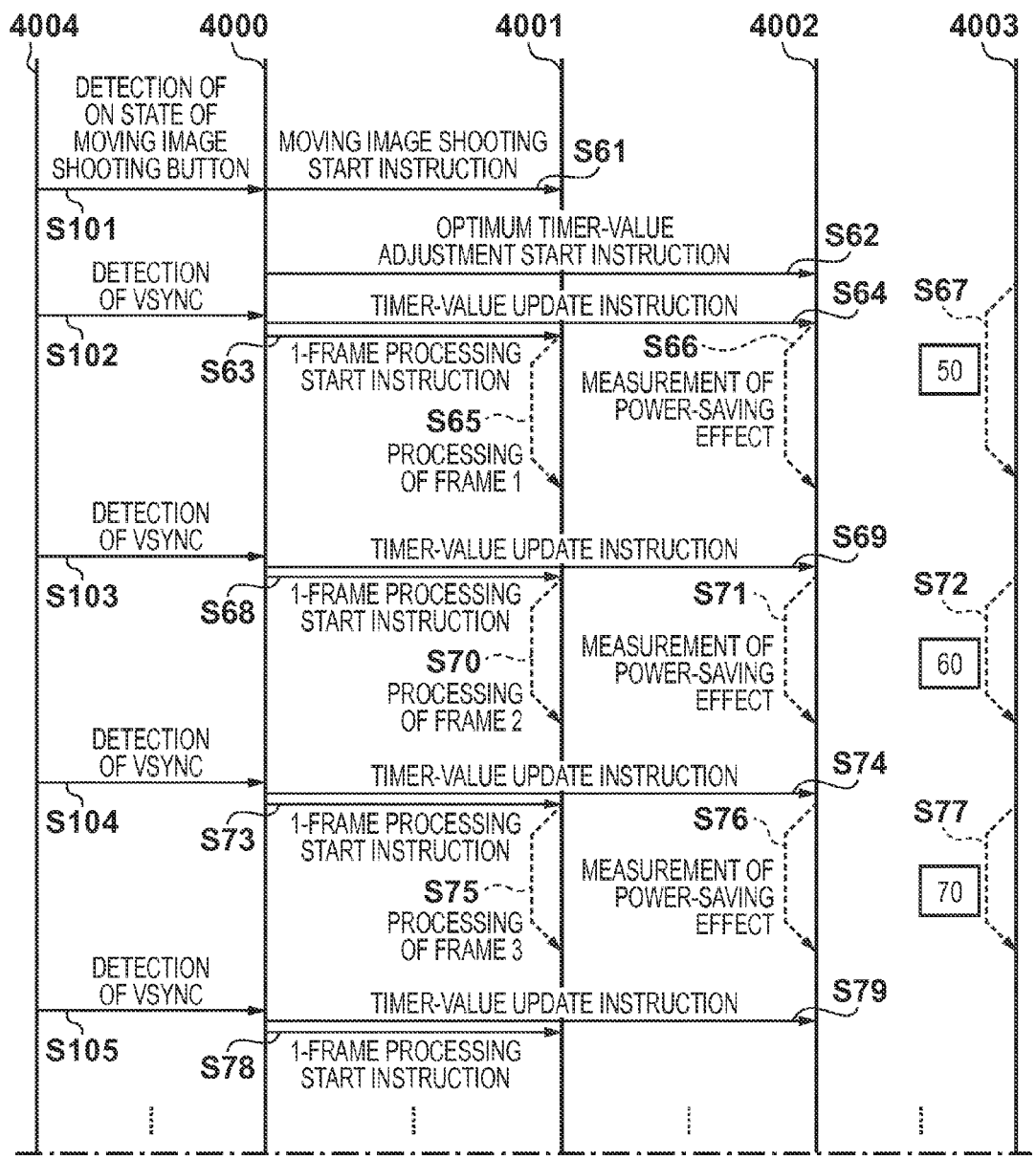
FIGS. 14A and 14B are a sequence chart showing a sequence of automatically adjusting an optimum timer value.
Figure 14B:
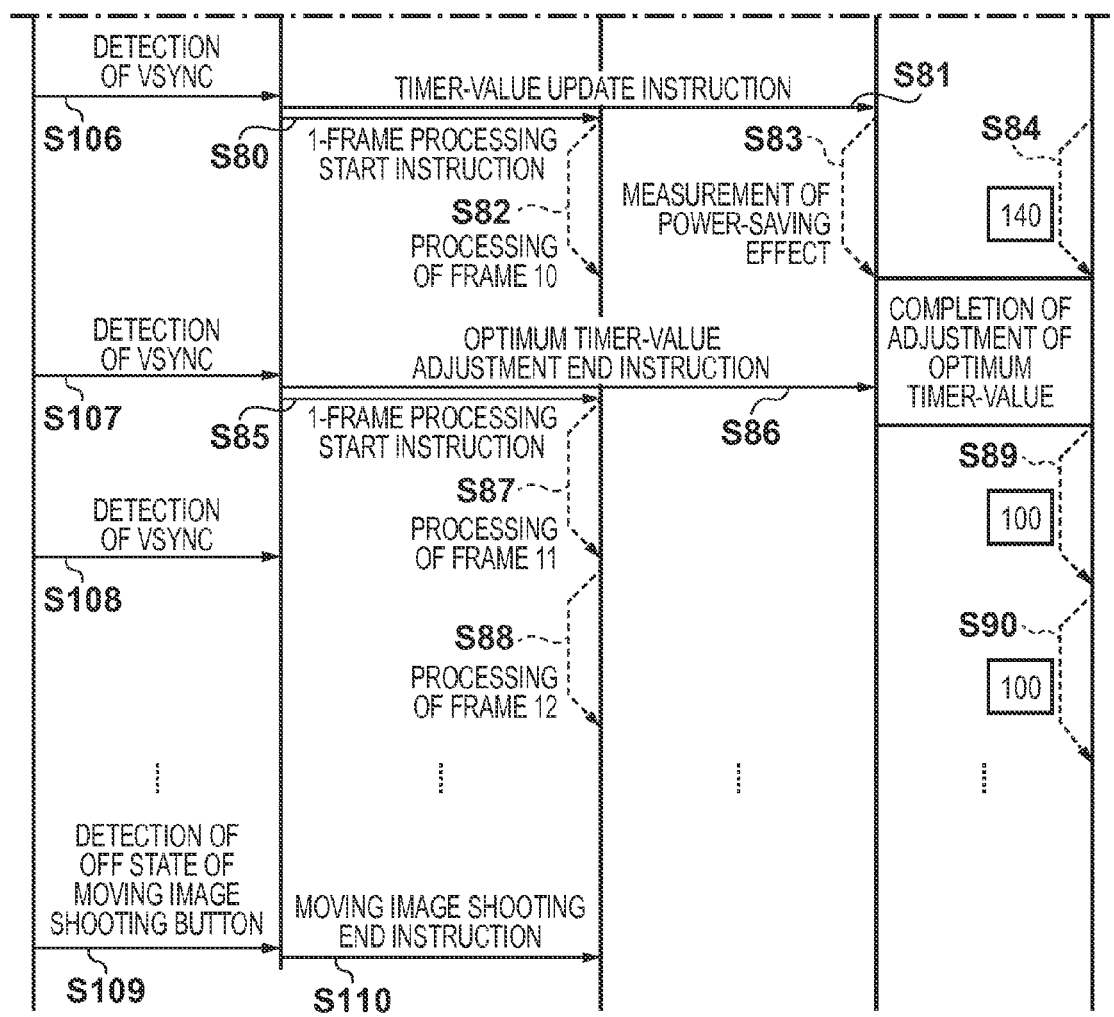

The sequence of automatically adjusting the optimum timer value, which has been explained with reference to FIGS. 12A and 12B, will be described below by exemplifying moving image shooting in the information processing apparatus 201 for the digital camera system. FIGS. 14A and 14B show the sequence of automatically adjusting the optimum timer value. In FIGS. 14A and 14B, the abscissa represents the unit of the control sequence of the information processing apparatus 201, and the ordinate represents the time axis and the processing contents of each control sequence.

FIGS. 14A and 14B show a sequence example in which the information processing apparatus 201 dynamically adjusts the timer value to decide the optimum timer value during processing of the first 10 frames of moving image shooting, and the optimum timer value is used for processing of the 11th frame and subsequent frames. A method of controlling, by the information processing apparatus 201, the mode selection signal 253, timer-value adjustment parameters 270, and timer-value update trigger signal 254 which are input to the timer-value optimization module 252 will be described.

Assume that the CPU 10 makes settings in advance in the setting register 800 so that an adjustment timer value for frame 1 is set to 50, and updated by 10 up to frame 10 every time the frame is updated. That is, assume that in the timer-value adjustment parameter field shown in FIG. 13, "50" is set in the start timer-value field, and "10" is set in the step-value field, and "10" is set in the timer-value update count field.

A sequence 4000 indicates the basic operation of the system executed by software such as an operating system (OS) in the CPU 10. A sequence 4001 indicates processing necessary for moving image shooting in the moving image processing unit 211. A sequence 4002 indicates optimum timer-value adjustment in the timer-value optimization module 252, and a timer value 4003 to be input to the interval timer 251 during or after adjustment is described together. A sequence 4004 indicates interrupt processing for detecting an event occurring in the system, and notifying the CPU 10 of it.

Upon detecting a moving image shooting request when the user presses (ON) the moving image shooting button of the camera body, an interrupt occurs in the CPU 10 (S101). Upon receiving the interrupt signal, the CPU 10 instructs the moving image processing unit 211 to start moving image shooting (S61). At the same time, the CPU 10 sets "1" in the mode selection field of the setting register 800 to activate the mode selection signal 253, and instructs the timer-value optimization module 252 to start optimum timer value adjustment (S62).

Upon detecting a video vertical synchronization signal (VSYNC) through the video input unit 212, an interrupt occurs in the CPU 10 (S102). Upon receiving the interrupt signal, the CPU 10 instructs the moving image processing unit 211 to start 1-frame processing for frame 1 (S63). At the same time, the CPU 10 sets "1" in the timer-value update trigger field of the setting register 800, and instructs the timer-value optimization module 252 to update the timer value (S64). Upon receiving the instruction, the timer-value adjustment module 255 of the timer-value optimization module 252 outputs the adjustment timer value 259 to the interval timer 251 according to the preset timer-value adjustment parameters 270 (S67). For the first update trigger, "50" set in the start timer-value field of the timer-value adjustment parameters 270 is output to the interval timer 251.

While the moving image processing unit 211 processes frame 1 (S65), the timer-value optimization module 252 measures the power-saving effect in the background for moving image processing (S66). A practical power-saving effect measurement method is as described above.

During this period of the 1-frame processing, the operation shown in FIG. 9 is repeated, that is, loading the timer value to the interval timer 251→counting down→loading-→counting down→, . . . , thereby issuing a power-saving mode transition request to the bus module. During this period, the adjustment timer value 259 used for timer value adjustment is always a constant value "50" (S67).

Upon detecting VSYNC of the second frame through the video input unit 212, an interrupt occurs in the CPU 10 (S103). Upon receiving the interrupt signal, the CPU 10 instructs the moving image processing unit 211 to start 1-frame processing for frame 2 (S68). Note that a 1-frame processing start instruction for frame 2 also serves as a processing end instruction for frame 1.

The CPU 10 issues the second timer-value update instruction to the timer-value optimization module 252 by setting "1" again in the timer-value update trigger field of the setting register 800 (S69). Upon receiving the instruction, the timer-value adjustment module 255 of the timer-value optimization module 252 outputs the adjustment timer value 259 to the interval timer 251 according to the preset timer-value adjustment parameters 270 (S72). For the second update trigger, "60" obtained by adding "10" set in the step-value field to "50" set in the start timer-value field of the timer-value adjustment parameters 270 is output to the interval timer 251. The subsequent operation is the same as that for the first frame.

The adjustment timer value 259 is set by the timer-value adjustment parameters 270 so that the initial value is 50 and 10 is added for each frame. Consequently, when the frame processing is repeated and the last adjustment is performed for frame 10, the adjustment timer value 259 becomes "140".

After completion of the processing of frame 10, when an interrupt occurs by VSYNC (S107), the CPU 10 instructs to start 1-frame processing for frame 11 (S85). The CPU 10 monitors the number of times of occurrence of VSYNC as an update trigger, determines that timer value adjustment is complete for the predetermined 10 frames, and sets "0" in the mode selection field. This deactivates the mode selection signal 253, and issues an optimum timer-value adjustment end instruction (S86).

In response to the optimum timer-value adjustment end instruction, the timer-value optimization module 252 selects an adjustment timer value with the highest power-saving effect among adjustment timer values for frames 1 to 10 (in subsequent frame 11). FIGS. 14A and 14B show a case in which an adjustment timer value "100" used for frame 6 is selected.

Upon detecting a moving image shooting end request when the user presses again (OFF) the moving image shooting button of the camera body, an interrupt occurs in the CPU 10 (S109). Upon receiving the interrupt signal, the CPU 10 instructs the moving image processing unit 211 to end moving image shooting (S110).

The frame processing and timer-value adjustment sequence from the start to the end of moving image shooting processing have been described. Although a case in which the CPU 10 generates an update trigger upon occurrence of an interrupt by VSYNC has been explained above, hardware may generate an update trigger without intervention of the CPU 10.

Decision of Optimum Timer Value

FIG. 15A shows an example of the power-saving effect measured for a timer value. That is, FIG. 15A shows the power-saving effect obtained as a result of searching for the optimum timer value of frames 1 to 10 in the timer-value adjustment sequence shown in FIGS. 14A and 14B.

FIG. 15A shows, for each frame number, an adjustment timer value used to process the frame, a power-saving mode period (power-saving mode counter value), a power-saving mode transition period (power-saving mode transition period counter value), and a power-saving effect (effect determination signal value). In the example shown in FIG. 15A, the highest power-saving effect value is "600" obtained for frame 6, and the timer value at this time is "100". In the example shown in FIG. 15A, in frame 11 and subsequent frames, "100" is adopted as the optimum timer value.

[Device State of Information Processing Apparatus 201]

A sequence of deciding the optimum timer value has been explained by exemplifying moving image shooting. However, the digital camera has various device states immediately after power-on in addition to a moving image shooting state, and the optimum timer value may be different for each state.

Figure 16:
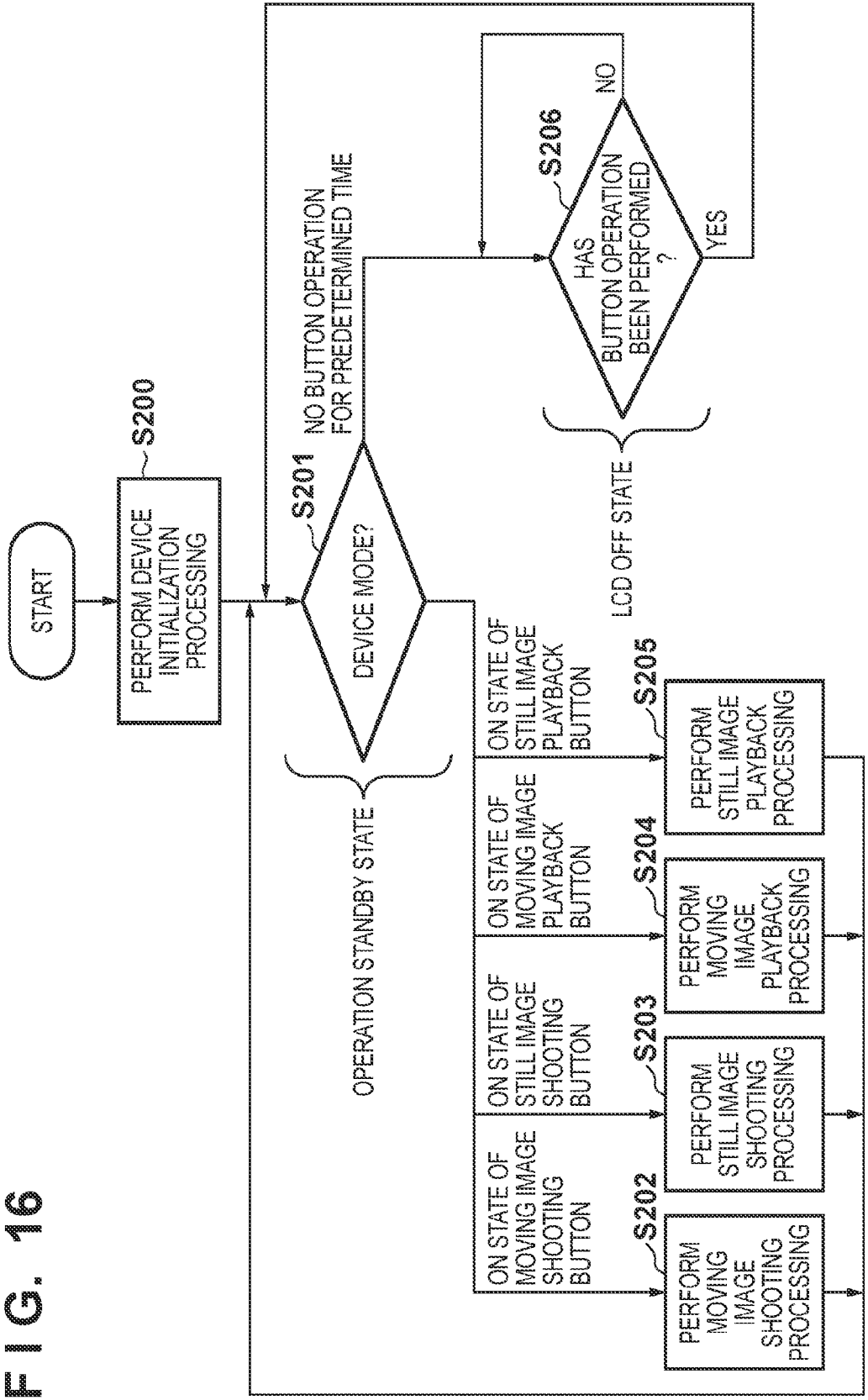
FIG. 16 is a flowchart for explaining each device state after powering on the information processing apparatus.

Each device state of the information processing apparatus 201 after power-on will be described with reference to FIG. 16. As the device states of the digital camera, seven states in total including an initialization state, operation standby state, liquid crystal display (LCD) OFF state, moving image shooting state, still image shooting state, moving image playback state, and still image playback state are defined.

Upon power-on, initialization processing is performed for the camera body (S200). Upon completion of the initialization processing, the camera transits to the operation standby state (S201) in which an operation of a button of the camera body by the user is awaited. If no button operation is performed by the user for a predetermined time, the camera transits to the LCD OFF state in which the LCD is powered off (S206). If a button operation is performed, the camera returns from the LCD OFF state (S206) to the operation standby state (S201).

A button operation causes the camera to transit from the operation standby state (S201) to one (operation mode) of the moving image shooting state, still image shooting state, moving image playback state, and the still image playback state. These four operation modes correspond to moving image shooting processing (S202), still image shooting processing (S203), moving image playback processing (S204), and still image playback processing (S205). Upon detecting pressing of each of the moving image shooting button, still image shooting button, moving image playback button, and still image playback button, the camera transits from the operation standby state (S201) to the corresponding operation mode. Upon completion of the processing in the operation mode, the camera returns to the operation standby state (S201).

Decision of Optimum Timer Value for Each Device State

Each of the moving image shooting state and the moving image playback state is divided into full high definition (FHD), high definition (HD), and standard in accordance with setting of a moving image size. Each of the still image shooting state and the still image playback state is divided into large (L), middle (M), and small (S) in accordance with setting of a still image size, and also divided in accordance with enable/disable of continuous shooting. Assume that the moving image size, still image size, and enable/disable of continuous shooting are preset by shooting mode setting buttons of the camera.

A method of deciding the optimum timer value in 18 divided device states in total will be described with reference to FIG. 15B. Note that since the optimum timer value may be different for each of processes for different data sizes, the states are divided, as described above.

In the embodiment, two kinds of optimum timer-value decision methods (TYP_1 and TYP_2) are prepared, and a decision method to be adopted is defined according to a device state. The method TYP_1 is a method of deciding the optimum timer value in one stage. The method $TYP_{13}$ 2 is a method of deciding the optimum timer value in two stages. Decision at the first stage corresponds to adjustment of the optimum timer value before product shipment. Decision at the second stage corresponds to adjustment of the optimum timer value after product shipment.

Figure 17A:
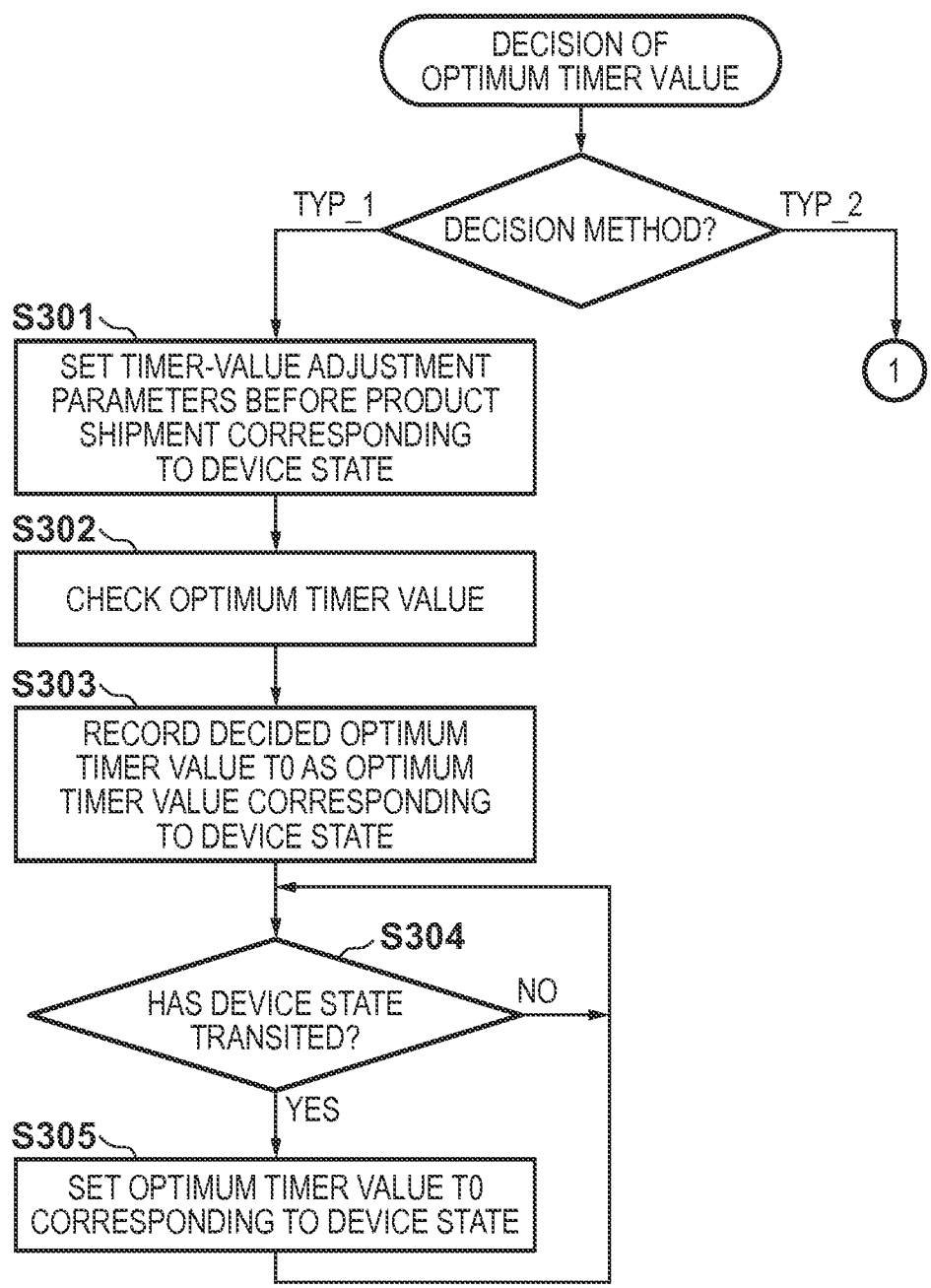
FIGS. 17A and 17B are a flowchart for explaining the difference between optimum timer-value decision methods TYP_1 and TYP_2.
Figure 17B:
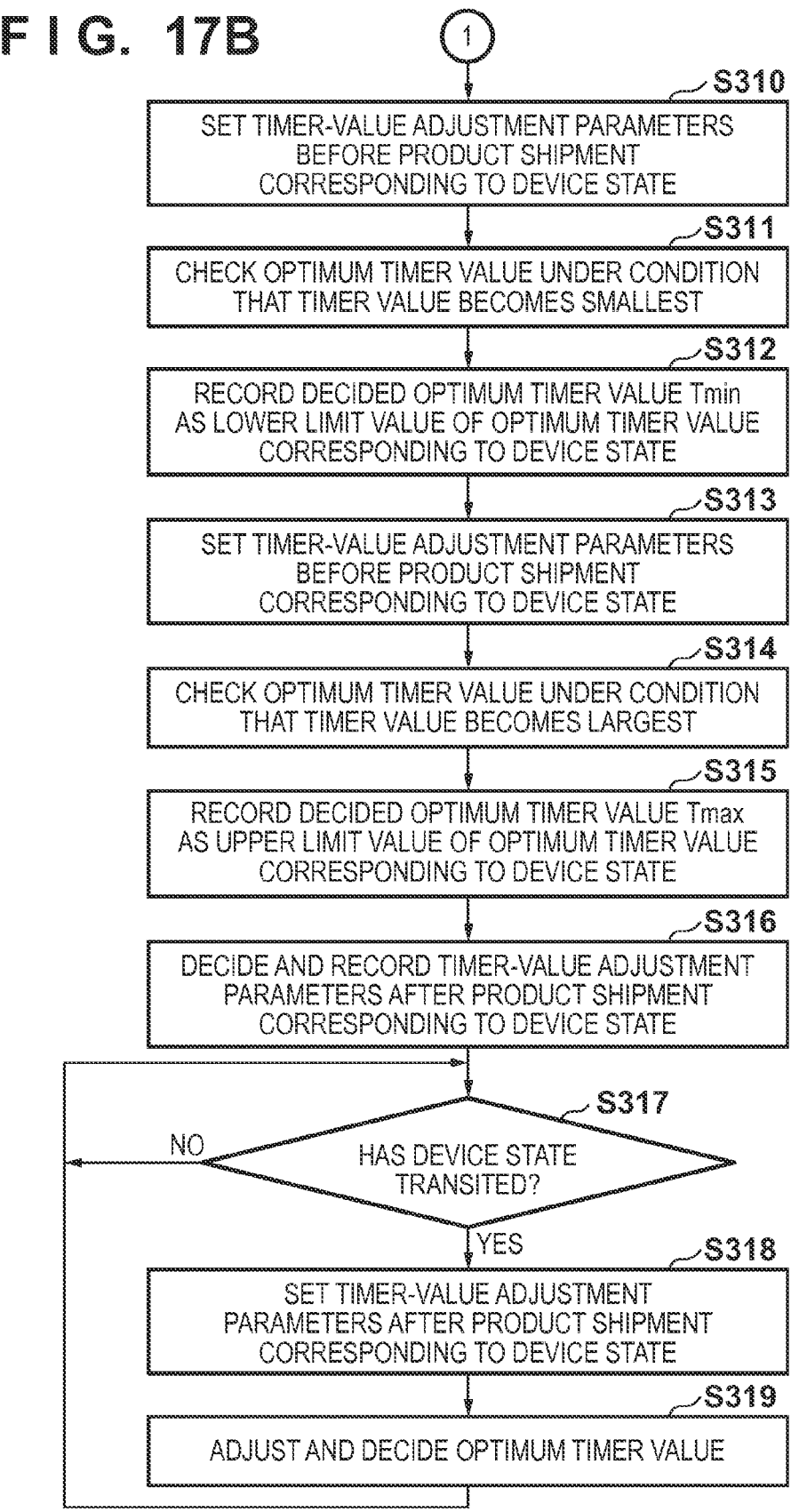

The difference between the optimum timer-value decision methods TYP_1 and TYP_2 will be described with reference to FIGS. 17A and 17B. For a device state in which the optimum timer-value decision method TYP_1 is adopted, the CPU 10 sets timer-value adjustment parameters before product shipment (S301). Timer-value adjustment parameters before product shipment shown in FIG. 15B are used as the timer value-adjustment parameters, and the adjustment parameters are different depending on the device state.

The optimum timer value is checked based on the set adjustment parameters (S302). An event used as a timer-value update trigger and an event used as a mode selection signal are different depending on the device state and a detailed description thereof will be provided later.

After the end of optimum timer-value adjustment, the CPU 10 reads the adjusted optimum timer-value reference field (see FIG. 13), acquires the decided optimum timer value (T0), and records the optimum timer value in the ROM 603 as the optimum timer value corresponding to the device state (S303).

After product shipment, when the device state transits (S304), the optimum timer value T0 which has been read out from the ROM 603 by the CPU 10 and corresponds to the device state is set in the timer-value ptimization module 252 through the fixed timer-value setting field (S305). Note that in the device state in which the optimum timer-value decision method TYP_1 is adopted, the timer value is never updated by the timer-value update trigger described with reference to the moving image shooting processing of FIGS. 12A and 12B, and thus the optimum timer value T0 is used as long as the camera is in the device state.

A detailed description will be given by exemplifying the "operation standby state" classified into the method TYP_1. Before product shipment, the optimum timer value is adjusted in the operation standby state. Since, however, processing contents are different from those after product shipment, a processing sequence is programmed as a test mode before product shipment.

When the device state transits to the operation standby state, the CPU 10 activates the mode selection signal 253 through the setting register 800. Referring to FIG. 15B, the timer-value adjustment parameters 270 are (start timer value, step value, timer update count)=(1, 1, 1000). The timer-value update trigger signal 254 used to update the timer value 1,000 times is a periodic timer interrupt occurring at a given interval.

Assuming that 1 millisecond (ms) is set for the periodic timer interrupt, the adjustment timer value is updated from 1 to 1,000 per millisecond, and the adjustment period is 1 ms×1,000=1 second. If an adjustment period of 10 seconds is required instead of 1 second, it may be programmed to transit from the operation standby state to the LCD OFF state within 10 seconds. If the time taken to adjust the optimum timer value is longer, processing which prevents the state from automatically transiting to the LCD OFF state may be necessary in the test mode.

Assuming that the operation standby state is almost constant before and after product shipment, the following processing is performed. After the end of optimum timer-value adjustment, the CPU 10 can obtain the optimum timer value decided before product shipment in the device state by reading the adjusted optimum timer-value reference register field of the setting register 800. The acquired optimum timer value is recorded in the ROM 603, and used after product shipment. FIG. 15B shows a case in which the optimum timer value in the operation standby state is decided to be "10". After product shipment, upon transiting to the operation standby state, "10" is written in the fixed timer-value setting field of the setting register 800, and then used as the optimum timer value in the operation standby state after product shipment.

The optimum timer-value decision method TYP_2 will be described next. In the device state in which the optimum timer-value decision method TYP_2 is adopted, two-stage optimum timer-value decision processing is performed. At the first stage, the adjustment range of the timer value is decided before product shipment. At the second stage, the adjustment timer-value is dynamically updated within the adjustment range after product shipment, thereby deciding the optimum timer value.

The CPU 10 sets the timer-value adjustment parameters 270 before product shipment in accordance with the device state (S310). Under the condition (sample) that the timer value becomes smallest, the optimum timer value is checked (S311). After the end of optimum timer-value adjustment, the CPU 10 reads the adjusted optimum timer-value reference field of the setting register 800, acquires the decided optimum timer value (Tmin), and records the optimum timer value in the ROM 603 as the lower limit of the optimum timer value corresponding to the device state (S312).

The CPU 10 sets again the timer-value adjustment parameters 270 before product shipment in accordance with the device state (S313). Under the condition (sample) that the timer value becomes largest, the optimum timer value is checked (S314). After the end of optimum timer-value adjustment, the CPU 10 reads the adjusted optimum timer-value reference field of the setting register 800, acquires the decided optimum timer value (Tmax), and records the optimum timer value in the ROM 603 as the upper limit of the optimum timer value corresponding to the device state (S315).

After the lower limit value (Tmin) and upper limit value (Tmax) of the optimum timer value are confirmed, the CPU 10 decides the timer-value adjustment parameters 270 after product shipment, and records the parameters in the ROM 603 (S316). When N represents the timer update count after product shipment, the timer-value adjustment parameters 270 are calculated by:

start timer value=Tmin;

step value=(Tmax−Tmin)/$N$;

timer update count=N;  (2)

Note that the timer update count N is, for example, 10. However, the timer update count N may be set to be variable after product shipment.

Alternatively, the timer update count N may be changed according to the device state.

After product shipment, when the device state transits (S317), the timer-value adjustment parameters 270 which have been read out from the ROM 603 by the CPU 10 and correspond to the device state are set (S318). The optimum timer value is adjusted and decided according to the mode selection signal 253 and timer-value update trigger signal 254 (S319). Note that the processes in steps S318 and S319 correspond to the processing for the first to 10th frames and the processing for the 11th frame and subsequent frames, which are shown in FIGS. 14A and 14B. That is, the processes in steps S318 and S319 are repeated, for example, every time the moving image shooting button is pressed to start moving image shooting.

A detailed description will be given by exemplifying the "moving image shooting state (SD)" classified into the method TYP_2. In moving image shooting, "a sample image for which the timer value is smallest" indicates a sample image with a high data compression ratio. In this case, it is assumed that the used bandwidth of the bus system becomes narrowest in the moving image shooting state (SD). Therefore, before product shipment, a sample image with a high data compression ratio is input to check the optimum timer value.

To the contrary, in moving image shooting, "a sample for which the timer value is largest" indicates a sample image with a low data compression ratio. In this case, it is assumed that the used bandwidth of the bus system becomes widest in the moving image shooting state (SD). Therefore, before product shipment, a sample image with a low data compression ratio is input to check the optimum timer value.

Referring to FIG. 15B, the timer-value adjustment parameters 270 before product shipment in the moving image shooting state (SD) are (start timer value, step value, timer update count)=(1, 1, 1,000). The timer-value update trigger signal 254 is generated by a VSYNC interrupt. If, therefore, the interval of VSYNC is 33 ms, the optimum timer value is obtained during a period of 33 ms×1,000=33 seconds. FIG. 15B shows a case in which the timer-value adjustment parameters 270 in the moving image shooting state (SD) after product shipment are decided to be (start timer value, step value, timer update count)=(50, 10, 10).

Device State, and Adjustment Mode Selection Signal and Timer-Value Update Trigger Signal FIGS. 18A to 18C show an example of the relationship between the device state of the digital camera product and the mode selection signal 253 and an example of the relationship between the device state and the timer-value update trigger signal 254.

In moving image shooting, as described above, the mode selection signal 253 is activated (timer-value adjustment mode) upon detecting the ON state of the moving image shooting button, and then deactivated (adjusted timer-value use mode) when the predetermined number of frames (for example, 1,000 frames before product shipment or 10 frames after product shipment) elapses. Since a relatively fine optimum timer value is obtained before product shipment and an optimum timer value is obtained within as a short time as possible after product shipment, the number of frames is different before and after product shipment.

Furthermore, in moving image shooting, the timer-value update trigger signal 254 is generated using a VSYNC interrupt. This assumes that a difference between frames is relatively small in moving image shooting. In some cases, the timer-value update trigger signal 254 is generated for a plurality of frames instead of each frame.

In still image shooting, before product shipment, the mode selection signal 253 is activated during a period in which 1,000 images are shot (from when the ON state of the still image shooting button for the first image is detected until still image shooting is completed after detecting the ON state of the still image shooting button for the 1,000th image). When continuous shooting is enabled, the mode selection signal 253 is kept active only during a period in which five images are shot after product shipment. The timer-value update trigger signal 254 is generated by an event (user event) in which the still image shooting button is pressed.

In the initialization processing of the device, the operation standby state, or the LCD OFF state, the mode selection signal 253 is activated when the state transits to a corresponding device state, and is deactivated when a predetermined update trigger is input. The timer-value update trigger signal 254 is periodically generated, instead of being generated by an event such as a moving image shooting event or still image shooting event.

The digital camera has been exemplified. Even in another electronic device, an event for each application according to the electronic device controls the mode selection signal 253 and timer-value update trigger signal 254.

Re-search for Optimum Timer Value

In the above optimum timer-value automatic adjustment sequence (FIGS. 14A and 14B), a case in which the optimum timer value is obtained before the 11th frame, and continuously used for the 11th frame and subsequent frames has been explained by exemplifying moving image shooting. In this method, however, the power-saving effect may decrease when an object to be shot largely changes in the 11th frame and subsequent frames. To solve this problem, a case in which the optimum timer value decided once in moving image shooting is adjusted again will be described below.

Re-searching for the optimum timer value will be explained with reference to FIG. 19. Re-searching for the optimum timer value is implemented using the power-saving effect measurement signal 2563 and effect decrease interrupt signal 213. Referring to FIG. 19, the abscissa represents the lapse of time, and the ordinate represents the device state, the frame number, and the states of various signals.

In the moving image shooting processing (SD), upon start of moving image shooting (T1), the timer-value is adjusted for the first 10 frames (T1 to T2), and the adjusted optimum timer value "100" is used for the subsequent frames (T2 to T3). Simultaneously with the end of timer-value adjustment at time T2, the power-saving effect measurement signal 2563 is activated, and the power-saving effect for each frame for the optimum timer value "100" is continuously measured. The power-saving effect measurement signal 2563 is activated when the CPU 10 writes "1" in the power-saving effect measurement field of the setting register 800. In the example shown in FIG. 19, a power-saving effect "570" is measured in the 11th frame and a power-saving effect "550" is measured in the 12th frame.

In the example shown in FIG. 19, a value $E_{Tadj}$ of the power-saving effect for the optimum timer value "100" during the timer-value adjustment period (T1 to T2) is "600". At the timing of occurrence of the timer-value update trigger signal 254, the effect comparison/optimum timer-value determination module 2562 compares the value $E_{Tadj}$ of the power-saving effect during the timer-value adjustment period with a value $E_T$ of the power-saving effect for each frame after the end of the timer-value adjustment period (T2 to T3). If the following expression holds, the effect comparison/optimum timer-value determination module 2562 asserts the effect decrease interrupt signal 213 (T3).

if ($E_T \le E_{Tadj}/2$) assert effect decrease interrupt signal 213; (3)

That is, occurrence of the effect decrease interrupt indicates a decrease in power-saving effect as the frame processing advances using the decided optimum timer value during the timer-value adjustment period (T1 to T2). Upon receiving the effect decrease interrupt signal, the CPU 10 performs timer-value adjustment again (T3 to T4). The timer-value adjustment method in re-searching for the optimum timer value is performed according to the same procedure as that of the first timer-value adjustment processing (T1 to T2).

In the example shown in FIG. 19, the same timer-value adjustment parameters 270 are used for the first and second timer-value adjustment processes. As a result, the optimum timer value is "70" during the second timer-value adjustment (T3 to T4) period, and the optimum timer value "70" is used after the second timer-value adjustment processing (T4 to T5). At the same time, power-saving effect measurement for each frame for the optimum timer value "70" is continued. When expression (3) holds again, a power-saving effect decrease interrupt occurs. Note that different timer-value adjustment parameters 270 may be set between the first and second timer-value adjustment processes, instead of the same timer-value adjustment parameters 270.

The moving image shooting operation mode has been exemplified above. However, the application and operation mode are not limited. Furthermore, a case has been explained in which the power-saving mode period and the power-saving mode transition period are counted and the difference between the periods is used to determine the power-saving effect. The determination method is merely an example. For example, the difference between the total power-saving mode transition enable count and the total power-saving mode transition disable count may be used. In this case, the power-saving mode period counter of the period measurement module 2560 is used as a measurement unit for counting the number of times transition to the power-saving mode succeeds to count the total power-saving mode transition enable count. The power-saving mode transition period counter of the transition period measurement module 2561 is used as a measurement unit for counting the number of times transition to the power-saving mode fails to count the total power-saving mode transition disable count.

A case has been explained above in which the timer-value adjustment stage and the adjusted optimum timer-value use stage are separately controlled with respect to input of the timer value to the interval timer 251 in each frame process by exemplifying moving image shooting. At the timer-value adjustment stage, since the optimum timer value for a moving image being shot is uncertain, the timer value is dynamically changed between frames based on a predetermined rule, and the power-saving effect for each adjustment timer value is quantitatively measured. At the optimum timer-value use stage after the end of timer-value adjustment, the timer value with the highest power-saving effect is used as the optimum timer value. This makes it possible to appropriately detect the non-operation period of the bus module 100 at the optimum timer-value use stage, and prolong the clock stop period, and thus a contribution to power saving is expected.

[Another Arrangement of Power Control Module]

Another arrangement of the power control module 25 will be described below. The master modules 300 include modules for periodically transferring a large amount of data, such as the DMACs 14 and 15, and modules for aperiodically performing short data transfer to replace a cache line, such as the CPUs 10 and 11 each incorporating a cache. Such master modules 300 with different characteristics coexist, and are connected to the bus system 30. Consequently, transfer data with different characteristics coexist in the bus system 30.

Attribute Generator

The attribute generator 106 shown in FIG. 4 receives the DTR signals received by all the STC I/Fs 501, and master IDs, and generates a data attribute signal indicating the attributes of transfer request data. The attribute generator 106 holds in advance the ID of the CPU and the ID of the DMAC, and can identify whether the master module 300 which has driven each DTR signal is a CPU or DMAC based on a corresponding one of the received master IDs. If all the master modules 300 for which the DTR signal is active are CPUs, the data attribute signal is activated. If all the master modules 300 for which the DTR signal is active are DMACs, the data attribute signal is deactivated. If CPUs and DMACs co-exist as the master modules 300 for which the DTR signal is active, the data attribute signal is deactivated.

Figure 20B:
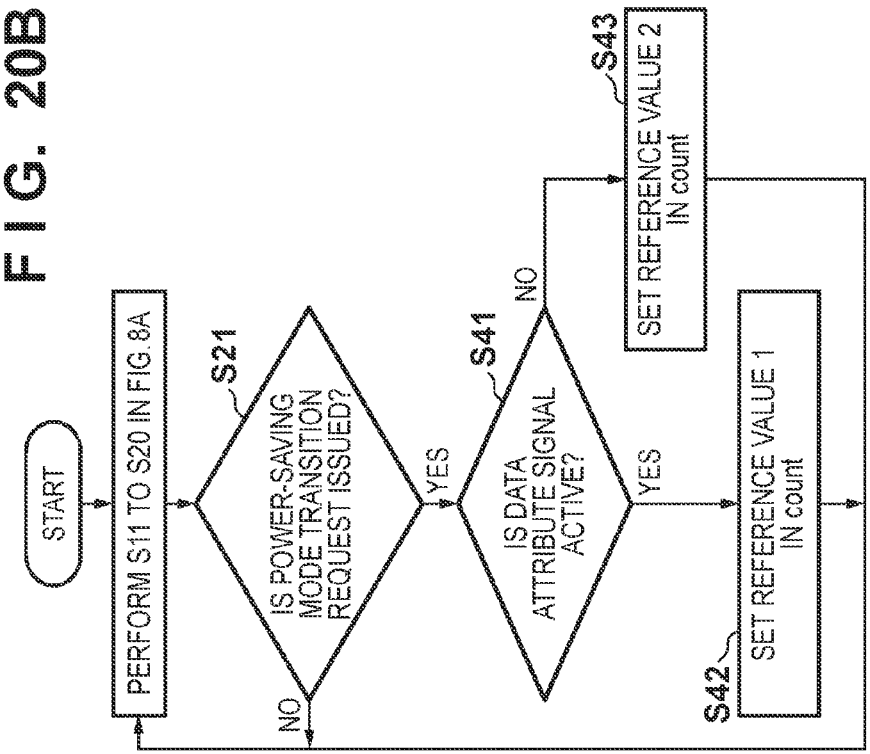
FIG. 20B is a flowchart for explaining processing by the control module when there are a plurality of reference values.
Figure 20A:
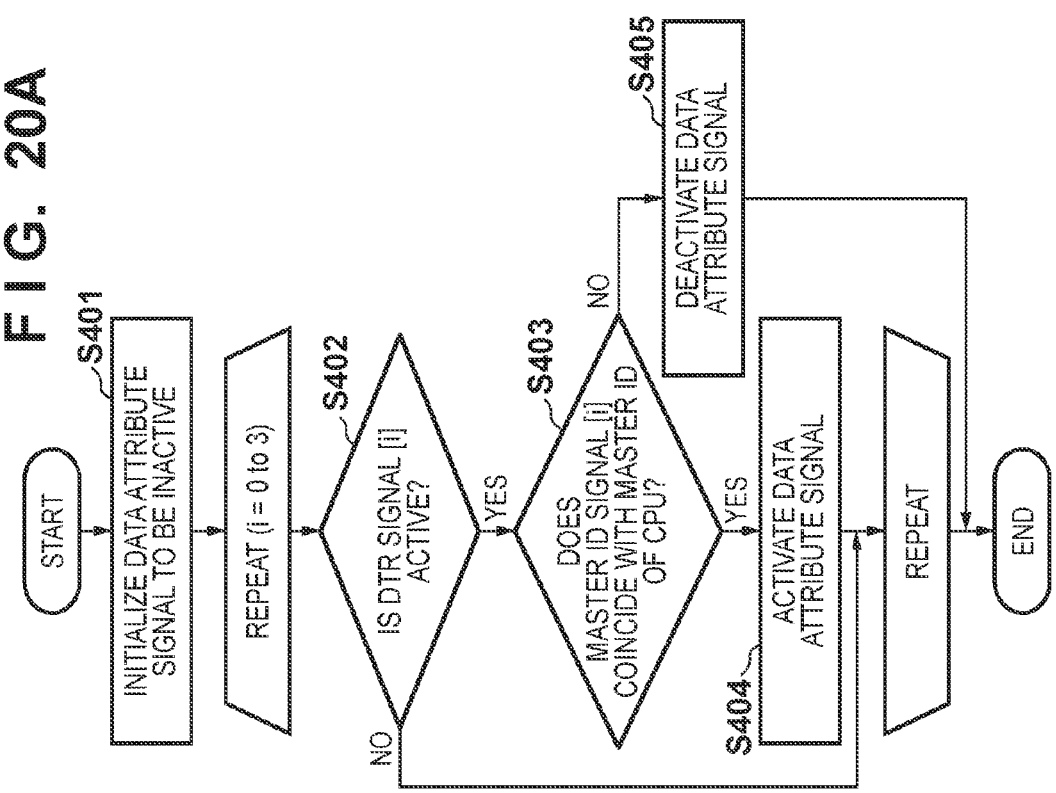
FIG. 20A is a flowchart for explaining the operation of an attribute generator.

The operation of the attribute generator 106 will be described with reference to a flowchart shown in FIG. 20A. When one or more DTR signals are active, the attribute generator 106 starts to operate, and initializes the data attribute signal to be inactive (S401). It is determined whether a DTR signal [0] is active (S402). If it is determined that the DTR signal [0] is active, it is determined whether a corresponding master ID signal [0] coincides with the master ID of the CPU (S403). If it is determined that the master ID signal [0] coincides with the master ID of the CPU, the data attribute signal is activated (S404), and performs determination processing for a next DTR signal [1] (S402).

If it is determined in step S402 that the DTR signal [0] is not active, the attribute generator 106 performs determination processing for the next DTR signal [1] (S402) by skipping steps S403 and S404. If it is determined in step S403 that the master ID signal [0] does not coincide with the master ID of the CPU, the attribute generator 106 deactivates the data attribute signal (S405), thereby terminating the process.

As another arrangement, the attribute generator 106 includes address information of a program area to be used by the processor, and address signals are input instead of the master ID signals. It is determined whether an address signal for which the DTR signal is active indicates an address in the program area. If the address signal indicates an address in the program area, the data attribute signal is activated.

As still another arrangement, by including the attribute signal indicating periodicity or aperiodicity in transfer data, the master module 300 for driving the DTR signal switches between periodicity and aperiodicity according to the transfer data. The attribute generator 106 receives the attribute signal instead of the master ID signals, thereby controlling the data attribute signal.

Power Control Module

Figure 21A:
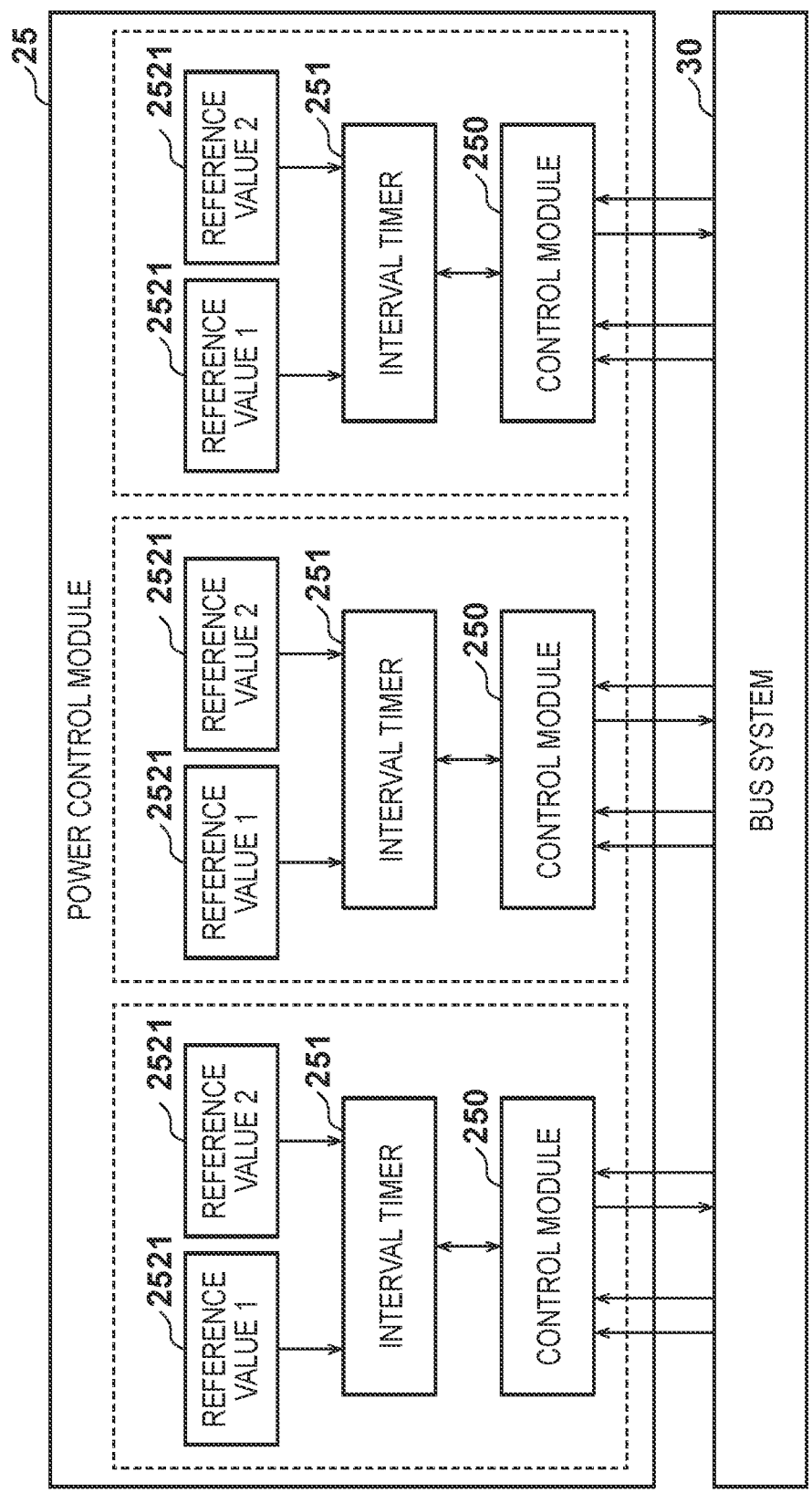
FIG. 21A is a block diagram showing another arrangement of the power control module.

FIG. 21A is a block diagram showing another arrangement of the power control module 25. The power control module 25 includes a power control I/F corresponding to each bus module 100. Each power control I/F includes a control module 250 for controlling transition/returning to/from the power-saving mode, an interval timer 251, and a plurality of reference values 2521 to be set in the interval timer 251, and manages the state of the corresponding bus module 100. The plurality of reference values 2521 are different from each other, and reference value 2 is sufficiently smaller than reference value 1. Note that each control module 250 is implemented when the CPU of the power control module 25 executes a program stored in the ROM of the power control module 25 or the like.

Processing by the control module 250 when the plurality of reference values 2521 are held will be described with reference to a flowchart shown in FIG. 20B. Note that in FIG. 20B, the same processes as those (S11 to S20) in FIG. 8A will be omitted.

After the process in step S20, the control module 250 determines again whether to issue a power-saving mode transition request (S21). If no power-saving mode transition request is issued, the process returns to step S12; otherwise, it is determined whether the data attribute signal is active (S41). If the data attribute signal is inactive, the control module 250 sets reference value 1 in the count value "count" of the interval timer 251 (S42). Alternatively, if the data attribute signal is active, the control module 250 sets reference value 2 in the count value "count" of the interval timer 251 (S43), and returns the process to step S13.

The above processing by the control module 250 can reduce the procedure associated with power control by the master modules 300 such as the CPUs 10 and 11. Furthermore, after causing the bus module 100 to transit to the power-saving mode, when receiving a return trigger, it is possible to control a period until the PSMTR signal is activated next in accordance with the data attribute of a data transfer request serving as the return trigger. When the data attribute is active, that is, for short transfer request data for replacing a cache line, which is aperiodically generated, smaller reference value 2 is selected. If the data attribute is inactive, larger reference value 1 is selected.

As another method, when the data attribute is active, the process may transit to step S15 in which the PSMTR signal is activated after a predetermined cycle without transiting to step S43 in which smaller reference value 2 is set.

Count Value of Interval Timer

Figure 21B:
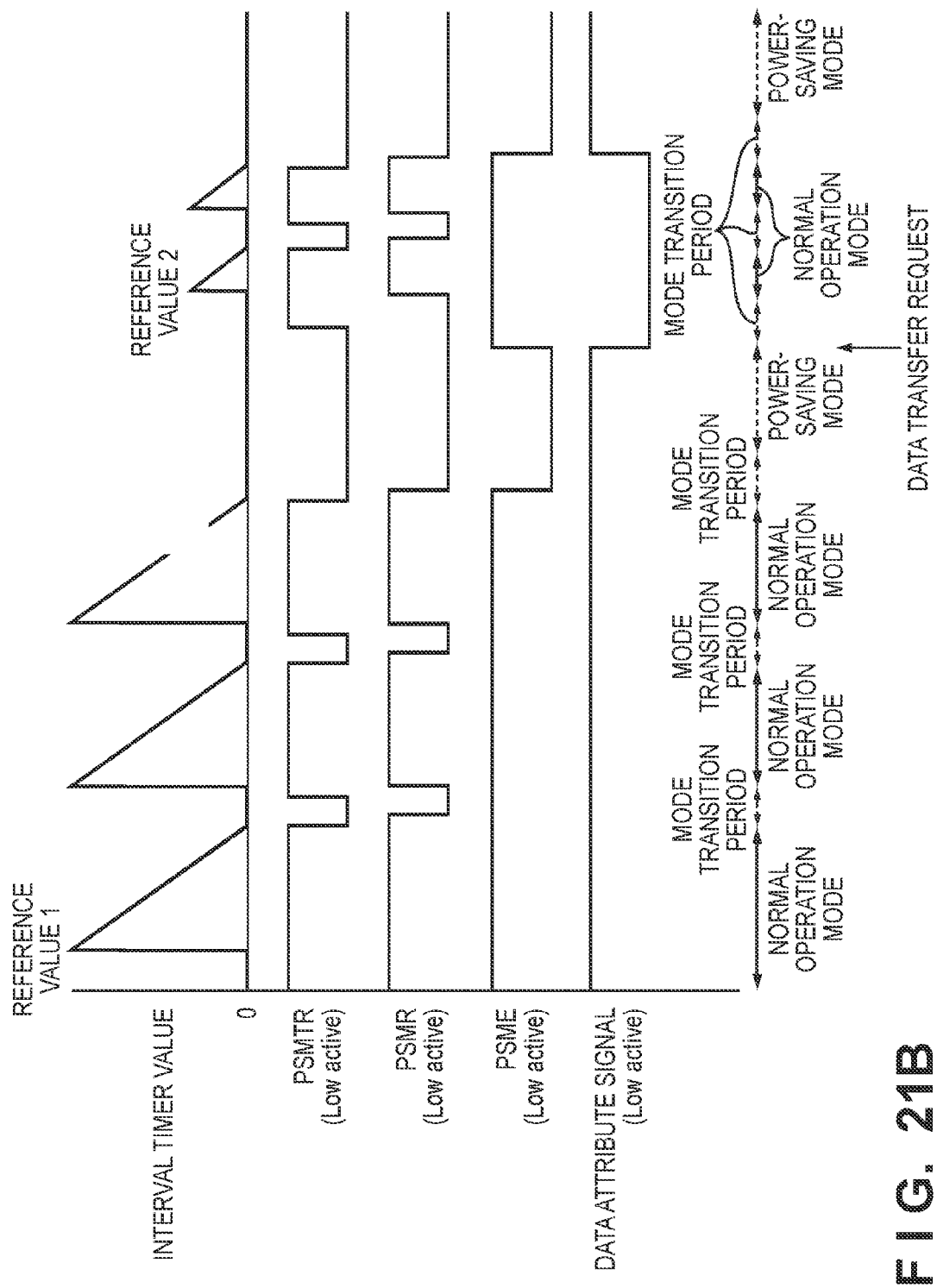
FIG. 21B is a view for explaining the relationship between the power control signals and a count value "count" of the interval timer.

The relationship between the power control signals and the count value "count" of the interval timer 251 will be described with reference to FIG. 21B.

A case in which after the PSMTR signal is activated, the PSMR signal becomes active but the PSME signal does not become active corresponds to a case in which the bus module 100 disables transition to the power-saving mode, as described above. In this case, the power control module 25 deactivates the PSMTR signal. After the time set in the interval timer 251 elapses, the power control module 25 activates the PSMTR signal again. That is, the power control module 25 issues a power-saving mode transition request at an interval set in the interval timer 251 without intervention of the CPU 10 or 11.

During a mode transition period for avoiding freezing and loss of data, the bus module 100 determines whether it is possible to transit to the power-saving mode, and notifies, if transition is possible, the power control module 25 of it. Only if transition to the power-saving mode is possible, the power control module 25 can control power supply and/or a clock, thereby saving the power of the bus module 100.

The power control module 25 includes the plurality of interval timers 251 in correspondence with the plurality of bus modules 100. The value of each interval timer 251 is switched according to the characteristic of transfer request data. If the transfer request data is a large amount of data periodically transferred like transfer data of the DMAC, the power control module 25 sets a large count value count1 in the interval timer 251, thereby decreasing opportunities to decrease the effective performance during the power-saving mode transition period.

For aperiodic short data transfer for replacing a cache line like transfer data of the CPU, the power control module 25 sets a small count value count2 in the interval timer 251, and controls to quickly transit to the power-saving mode. That is, it is possible to obtain the optimum balance between the power consumption and the effective performance of transfer in consideration of the characteristic of the transfer request data.

For easy understanding of the present invention by those skilled in the art, the principle and applications of the present invention have been briefly explained. Embodiments obtained by making various changes to the above description can be suite to specific applications, and are included in the scope of the present invention. For example, although a case in which the interval timer 251 is a down counter has been explained with reference to FIGS. 8A, 8B, and 9, an up counter can be used as the interval timer 251.

As described above, the bus system 30 capable of performing power control without requiring any special processing for the master modules 300 to avoid freezing and loss of transfer data can be provided. Furthermore, the bus module 100 which can periodically transit to the power-saving mode by a relatively simple mechanism without using any special dedicated circuit can be provided. It is, therefore, possible to increase opportunities to reduce leak power caused by interruption of the power supply, and opportunities to reduce the dynamic power of the clock tree caused by interruption of the clock.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-253609 filed Dec. 6, 2013 and No. 2014-160802 filed Aug. 6, 2014 which are hereby incorporated by reference herein in their entirety.

What is claimed is:

1. An information processing apparatus comprising:
a data transfer unit comprising a plurality of bus modules, wherein each bus module is configured to perform data transfer between a plurality of master modules and at least one slave module; and
a power control unit configured to control transition to a power-saving mode of each bus module based on communication with each of the plurality of bus modules,
wherein the power control unit is configured to comprise a plurality of control units corresponding to the plurality of bus modules respectively, and each control unit is configured to perform communication with the corresponding bus module using power control signals,
wherein the power control signals comprise a request signal transmitted to the corresponding bus module by the control unit to request to transit to the power-saving mode, and a response signal and an enable signal indicating enable/disable of transition to the power-saving mode, which are received from the corresponding bus module,
wherein each of the plurality of bus modules performs the data transfer by a two-line handshake using a data transfer request signal and a data transfer ready-to receive signal, and in a case where the request signal received from the corresponding control unit is activated, each bus module deactivates the data transfer ready-to-receive signal to transit to a transfer data non-reception state, and determines whether or not there is data transfer in progress.

2. The apparatus according to claim 1, wherein after activating the request signal to be transmitted to the corresponding bus module, the control unit determines states of the response signal and the enable signal received from the bus module, and determines whether the bus module can transit to the power-saving mode.

3. The apparatus according to claim 2, wherein in a case where the control unit determines that it is possible to transit to the power-saving mode, the control unit controls either power or a clock to be supplied to the corresponding bus module to cause the bus module to transit to the power-saving mode.

4. The apparatus according to claim 2, wherein in a case where the control unit determines that it is impossible to transit to the power-saving mode, the control unit deactivates the request signal to be transmitted to the corresponding bus module, and then activates the request signal to be transmitted to the corresponding bus module again after an interval time elapses.

5. The apparatus according to claim 4, further comprising:
a first measurement unit configured to measure a time based on an input time setting value to detect a lapse of the interval time; and
an optimization unit configured to output the time setting value to the first measurement unit to optimize the interval time,
wherein the optimization unit determines, based on a determination index of a power-saving effect, a first time setting value for which the power-saving effect is highest, and outputs the first time setting value to the first measurement unit as the time setting value.

6. The apparatus according to claim 5, wherein the optimization unit has a second time setting value which can be dynamically changed, and outputs the second time setting value to the first measurement unit instead of the first time setting value to measure the determination index of the power-saving effect.

7. The apparatus according to claim 6, wherein the optimization unit decides the first time setting value based on the determination index of the power-saving effect for at least one second time setting value.

8. The apparatus according to claim 6, wherein the optimization unit comprises a determination unit configured to determine the determination index of the power-saving effect for each second time setting value, and
wherein based on a determination result of the determination unit, the optimization unit decides, as the first time setting value, a time setting value for which the power-saving effect is highest.

9. The apparatus according to claim 6, wherein a timing at which the optimization unit dynamically changes the second time setting value is controlled by an update trigger.

10. The apparatus according to claim 9, wherein switching from the second time setting value to the first time setting value by the optimization unit is controlled depending on whether the number of times of occurrence of the update trigger reaches a predetermined count.

11. The apparatus according to claim 6, wherein after outputting at least one second time setting value to the first measurement unit, the optimization unit outputs the first time setting value to the first measurement unit.

12. The apparatus according to claim 6, wherein the optimization unit changes the second time setting value based on an input adjustment parameter.

13. The apparatus according to claim 12, wherein the adjustment parameter comprises at least one of an initial setting value, an update step value, and an update count.

14. The apparatus according to claim 6, wherein the optimization unit comprises:
a first storing unit configured to temporarily store the determination index of the power-saving effect for the second time setting value, and the second time setting value;
a comparison unit configured to compare the determination index of the power-saving effect stored in the storing unit with the determination index of the power-saving effect for a new second time setting value; and
a second storing unit configured to store a time setting value,
wherein the optimization unit updates the time setting value stored in the second storing unit according to a comparison result of the comparison unit, and sets, as the first time setting value, the time setting value stored in the second storage unit in a case where switching from the second time setting value to the first time setting value.

15. The apparatus according to claim 5, wherein the optimization unit comprises:
a second measurement unit configured to measure a total period that the corresponding bus module is in the power-saving mode; and
a third measurement unit configured to measure a total period required the corresponding bus module to transit to the power-saving mode,
wherein the optimization unit calculates, as the determination index of the power-saving effect, a result of subtracting a measurement result of the third measurement unit from a measurement result of the second measurement unit.

16. The apparatus according to claim 5, wherein the optimization unit comprises:
a second measurement unit configured to measure a number of times transition to the power-saving mode by the control unit succeeds; and
a third measurement unit configured to measure a number of times transition to the power-saving mode by the control unit fails,
wherein the optimization unit calculates, as the determination index of the power-saving effect, a result of subtracting the number of times transition to the power-saving mode fails from the number of times transition to the power-saving mode succeeds.

17. The apparatus according to claim 6, wherein start or end of a period, during which the determination index of the power-saving effect for the second time setting value is measured, is controlled based on either a periodic synchronization signal used by the information processing apparatus or an event occurring in the information processing apparatus.

18. The apparatus according to claim 17, wherein the periodic synchronization signal is a video vertical synchronization signal.

19. The apparatus according to claim 9, wherein occurrence of the update trigger is controlled based on either a periodic synchronization signal used by the information processing apparatus or an event occurring in the information processing apparatus.

20. The apparatus according to claim 6, wherein the optimization unit has the first time setting value and the second time setting value for each of processes in which bandwidths of the bus modules of the information processing apparatus are different.

21. The apparatus according to claim 6, wherein the optimization unit has the first time setting value and the second time setting value for each of processes in which data sizes processed by the information processing apparatus are different.

22. The apparatus according to claim 6, wherein the optimization unit has the first time setting value and the second time setting value for each of different applications of the information processing apparatus.

23. The apparatus according to claim 6, wherein the second time setting value is acquired before product shipment, and the first time setting value is used after product shipment.

24. The apparatus according to claim 12, wherein a first second-time setting value under a first condition and a second second-time setting value under a second condition are acquired before product shipment, and the two time setting values are used to decide the adjustment parameter after product shipment.

25. The apparatus according to claim 24, wherein the first condition is that a bandwidth of the bus module is widest, and the second condition is that the bandwidth of the bus module is narrowest.

26. The apparatus according to claim 8, wherein the determination unit acquires the determination index of the power-saving effect for the first time setting value, and generates an interrupt signal based on a result of comparing the determination index of the power-saving effect with a predetermined threshold, and
wherein in a case where the interrupt signal is generated, the optimization unit measures the determination index of the power-saving effect.

27. The apparatus according to claim 4, wherein the interval time is set according to a data transfer capability of each bus module.

28. The apparatus according to claim 1, wherein after the determination, each bus module activates the response signal to be transmitted to the corresponding control unit.

29. The apparatus according to claim 1, wherein each bus module comprises a detection unit configured to detect a state of the data transfer request signal received by the bus module, and output the enable signal, and
wherein the detection unit outputs the enable signal based on a result of the determination and a result of the detection.

30. The apparatus according to claim 29, wherein in a case where the determination result indicates absence of data transfer in progress, and the detection result indicates absence of new data transfer, the detection unit activates the enable signal to indicate that transition to the power-saving mode is possible.

31. The apparatus according to claim 29, wherein in a case where the detection result indicates presence of new data transfer, the detection unit deactivates the enable signal to indicate that transition to the power-saving mode is impossible.

32. The apparatus according to claim 1, wherein in a case where the enable signal being received from the corresponding bus module changes to an inactive state, each control unit receives an attribute of transfer data, and controls a time until the request signal is activated again after canceling the power-saving mode in accordance with the attribute of the transfer data.

33. The apparatus according to claim 32, wherein the attribute of the transfer data indicates periodically or aperiodically generated data.

34. The apparatus according to claim 32, wherein a time until the power control signal is activated in a case where it is determined that the attribute of the transfer data indicates data for replacing a cache line is shorter than a time until the power control signal is activated in another case where it is determined that the attribute of the transfer data does not indicate data for replacing the cache line.

35. The apparatus according to claim 32, wherein the attribute of the transfer data indicates a master ID for identifying a module for driving a data transfer request signal.

36. The apparatus according to claim 32, wherein the attribute of the transfer data indicates an address.

37. A data transfer apparatus comprising a plurality of bus modules configured to perform data transfer between a master module and a slave module by a handshake using a data transfer request signal and a data transfer ready-to-receive signal, wherein each bus module comprises:
- a control unit configured to, in a case where a request signal to request transition to a power-saving mode is received, change a state of the data transfer ready-to-receive signal to transit to a transfer data non-reception state, and determine whether or not there is data transfer in progress;
- a detection unit configured to detect a state of the data transfer request signal received by the bus module; and
- an output unit configured to output an enable signal indicating enable/disable of transition to the power-saving mode based on a result of the determination and a result of the detection.

38. A control method of a data transfer apparatus comprising a plurality of bus modules, each of which is configured to perform data transfer between a plurality of master modules and at least one slave module, and a power control unit, the method comprising steps of:
- performing communication between the power control unit and each of the plurality of bus modules; and
- controlling, based on the communication, transition to a power-saving mode of each bus module by the power control unit,
- wherein the power control unit is configured to comprise a plurality of control units corresponding to the plurality of bus modules respectively, and each control unit is configured to perform communication with the corresponding bus module using power control signals,
- wherein the power control signals comprise a request signal transmitted to the corresponding bus module by the control unit to request to transit to the power-saving mode, and a response signal and an enable signal indicating enable/disable of transition to the power-saving mode, which are received from the corresponding bus module;
- wherein each of the plurality of bus modules performs the data transfer by a two-line handshake using a data transfer request signal and a data transfer ready-to receive signal, and in a case where the request signal received from the corresponding control unit is activated, each bus module deactivates the data transfer ready-to-receive signal to transit to a transfer data non-reception state, and determines whether or not there is data transfer in progress.

39. A non-transitory computer readable medium storing a computer-executable program for causing a computer to perform a control method of a data transfer apparatus comprising a plurality of bus modules, each of which is configured to perform data transfer between a plurality of master modules and at least one slave module, and a power control unit, the method comprising steps of:
- performing communication between the power control unit and each of the plurality of bus modules; and
- controlling, based on the communication, transition to a power-saving mode of each bus module by the power control unit,
- wherein the power control unit is configured to comprise a plurality of control units corresponding to the plurality of bus modules respectively, and each control unit is configured to perform communication with the corresponding bus module using power control signals,
- wherein the power control signals comprise a request signal transmitted to the corresponding bus module by the control unit to request to transit to the power-saving mode, and a response signal and an enable signal indicating enable/disable of transition to the power-saving mode, which are received from the corresponding bus module;
- wherein each of the plurality of bus modules performs the data transfer by a two-line handshake using a data transfer request signal and a data transfer ready-to receive signal, and in a case where the request signal received from the corresponding control unit is activated, each bus module deactivates the data transfer ready-to-receive signal to transit to a transfer data non-reception state, and determines whether or not there is data transfer in progress.

40. A control method of a data transfer apparatus comprising a plurality of bus modules configured to perform data transfer between a master module and a slave module by a handshake using a data transfer request signal and a data transfer ready-to-receive signal, the method comprising:
- controlling to, in a case where a request signal to request transition to a power-saving mode is received by a bus module, change a state of the data transfer ready-to-receive signal to transit to a transfer data non-reception state, and determine whether or not there is data transfer in progress;
- detecting a state of the data transfer request signal received by the bus module; and
- outputting an enable signal indicating enable/disable of transition to the power-saving mode based on a result of the determination and a result of the detection.

41. A non-transitory computer readable medium storing a computer-executable program for causing a computer to perform a control method of a data transfer apparatus comprising a plurality of bus modules configured to perform data transfer between a master module and a slave module by a handshake using a data transfer request signal and a data transfer ready-to-receive signal, the method comprising:
- controlling to, in a case where a request signal to request transition to a power-saving mode is received by a bus module, change a state of the data transfer ready-to-receive signal to transit to a transfer data non-reception state, and determine whether or not there is data transfer in progress;
- detecting a state of the data transfer request signal received by the bus module; and
- outputting an enable signal indicating enable/disable of transition to the power-saving mode based on a result of the determination and a result of the detection.

42. An information processing apparatus comprising:
- a data transfer unit comprising a plurality of bus modules, wherein each bus module is configured to perform data transfer between a plurality of master modules and at least one slave module by a handshake using a data transfer request signal and a data transfer ready-to-receive signal; and
- a power control unit configured to control transition to a power-saving mode of each bus module based on communication with each of the plurality of bus modules,
- wherein the power control unit comprises a plurality of control units corresponding to the plurality of bus modules respectively, and each control unit is configured to perform communication with a corresponding bus module using power control signals, and
- wherein in a case where the control unit determines that it is impossible to transit to the power-saving mode based on the data transfer request signal, each bus module deactivates the data transfer ready-to-receive signal to transit to a transfer data non-reception state, and the control unit deactivates a request signal to be transmitted to the corresponding bus module to request to transit to the power-saving mode, and then activates the request signal to be transmitted to the corresponding bus module again after a predetermined time elapses.

43. The apparatus according to claim 42, wherein in a case where the control unit determines that it is impossible to transit to the power-saving mode, the control unit repeatedly deactivates the power control signal, and then activates the power control signal after the predetermined time elapses.

44. The apparatus according to claim 37, further comprising:
a power control unit configured to control transition to a power-saving mode of each bus module based on communication with each of the plurality of bus modules,
wherein in a case where the enable signal indicating enable of transition to the power-saving mode is output by the output unit, the control unit controls either power or a clock to be supplied to the corresponding bus module to cause the bus module to transit to the power-saving mode.

45. The apparatus according to claim 37, further comprising:
a power control unit configured to control transition to a power-saving mode of each bus module based on communication with each of the plurality of bus modules,
wherein in a case where the enable signal indicating disable of transition to the power-saving mode is output by the output unit, the control unit deactivates the request signal to be transmitted to the corresponding bus module, and then activates the request signal to be transmitted to the corresponding bus module again after an interval time elapses.

46. The apparatus according to claim 45, further comprising:
a first measurement unit configured to measure a time based on an input time setting value to detect a lapse of the interval time; and
an optimization unit configured to output the time setting value to the first measurement unit to optimize the interval time,
wherein the optimization unit determines, based on a determination index of a power-saving effect, a first time setting value for which the power-saving effect is highest, and outputs the first time setting value to the first measurement unit as the time setting value.

47. The apparatus according to claim 46, wherein the optimization unit has a second time setting value which can be dynamically changed, and outputs the second time setting value to the first measurement unit instead of the first time setting value to measure the determination index of the power-saving effect.

48. The apparatus according to claim 47, wherein a start or end of a period, during which the determination index of the power-saving effect for the second time setting value is measured, is controlled based on either a periodic synchronization signal used by the information processing apparatus or an event occurring in the information processing apparatus.

49. A control method of an information processing apparatus comprising a power control unit and a plurality of bus modules, wherein each bus module is configured to perform data transfer between a plurality of master modules and at least one slave module by a handshake using a data transfer request signal and a data transfer ready-to-receive signal, the method comprising:
controlling transition to a power-saving mode of each bus module based on communication with each of the plurality of bus modules,
wherein the power control unit comprises a plurality of control units corresponding to the plurality of bus modules respectively, and each control unit is configured to perform communication with a corresponding bus module using power control signals, and
wherein in a case where it is determined that it is impossible to transit to the power-saving mode based on the data transfer request signal, each bus module deactivates the data transfer ready-to-receive signal to transit to a transfer data non-reception state, and the control unit deactivates a request signal to be transmitted to the corresponding bus module to request to transit to the power-saving mode, and then activates the request signal to be transmitted to the corresponding bus module again after a predetermined time elapses.

50. A non-transitory computer readable medium storing a computer-executable program for causing a computer to perform a control method of a information processing apparatus comprising a power control unit and a plurality of bus modules, wherein each bus module is configured to perform data transfer between a plurality of master modules and at least one slave module by a handshake using a data transfer request signal and a data transfer ready-to-receive signal, the method comprising:
controlling transition to a power-saving mode of each bus module based on communication with each of the plurality of bus modules,
wherein the power control unit comprises a plurality of control units corresponding to the plurality of bus modules respectively, and each control unit is configured to perform communication with a corresponding bus module using power control signals, and
wherein in a case where it is determined that it is impossible to transit to the power-saving mode based on the data transfer request signal, each bus module deactivates the data transfer ready-to-receive signal to transit to a transfer data non-reception state, and the control unit deactivates a request signal to be transmitted to the corresponding bus module to request to transit to the power-saving mode, and then activates the request signal to be transmitted to the corresponding bus module again after a predetermined time elapses.

* * * * *